(12) United States Patent
Goyal et al.

(10) Patent No.: US 9,723,199 B1
(45) Date of Patent: *Aug. 1, 2017

(54) FOCUS SPECIFICATION AND FOCUS STABILIZATION

(71) Applicant: Amazon Technologies, Inc., Seattle, WA (US)

(72) Inventors: Dushyant Goyal, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,024

(22) Filed: Dec. 7, 2016

Related U.S. Application Data

(63) Continuation of application No. 14/842,754, filed on Sep. 1, 2015, now Pat. No. 9,549,125.

(51) Int. Cl.
| | | |
|---|---|---|
| *H04N 5/232* | (2006.01) | |
| *H04N 7/18* | (2006.01) | |
| *G06K 9/32* | (2006.01) | |
| *G02B 7/36* | (2006.01) | |

(52) U.S. Cl.
CPC ......... *H04N 5/23212* (2013.01); *G02B 7/36* (2013.01); *G06K 9/3233* (2013.01); *H04N 5/23216* (2013.01); *H04N 5/23293* (2013.01); *H04N 7/183* (2013.01)

(58) Field of Classification Search
CPC ................................................ H04N 5/23287
See application file for complete search history.

(56) References Cited

U.S. PATENT DOCUMENTS

| | | |
|---|---|---|
| 2010/0158343 A1 | 6/2010 | Bryll |
| 2014/0226914 A1 | 8/2014 | Mocanu et al. |

*Primary Examiner* — Gary C Vieaux
(74) *Attorney, Agent, or Firm* — Athorus, PLLC

(57) ABSTRACT

An imaging device may be configured to monitor a field of view for various objects or events occurring therein. The imaging device may capture a plurality of images at various focal lengths, identify a region of interest including one or more semantic objects therein, and determine measures of the levels of blur or sharpness within the regions of interest of the images. Based on their respective focal lengths and measures of their respective levels of blur or sharpness, a focal length for capturing subsequent images with sufficient clarity may be predicted. The imaging device may be adjusted to capture images at the predicted focal length, and such images may be captured. Feedback for further adjustments to the imaging device may be identified by determining measures of the levels of blur or sharpness within the subsequently captured images.

20 Claims, 18 Drawing Sheets

FOCAL LENGTH
120 mm
SUBJECT DISTANCE 2
16 ft

FOCAL LENGTH
100 mm
SUBJECT DISTANCE 1
10 ft

FOCAL LENGTH
150 mm
SUBJECT DISTANCE 3
20 ft

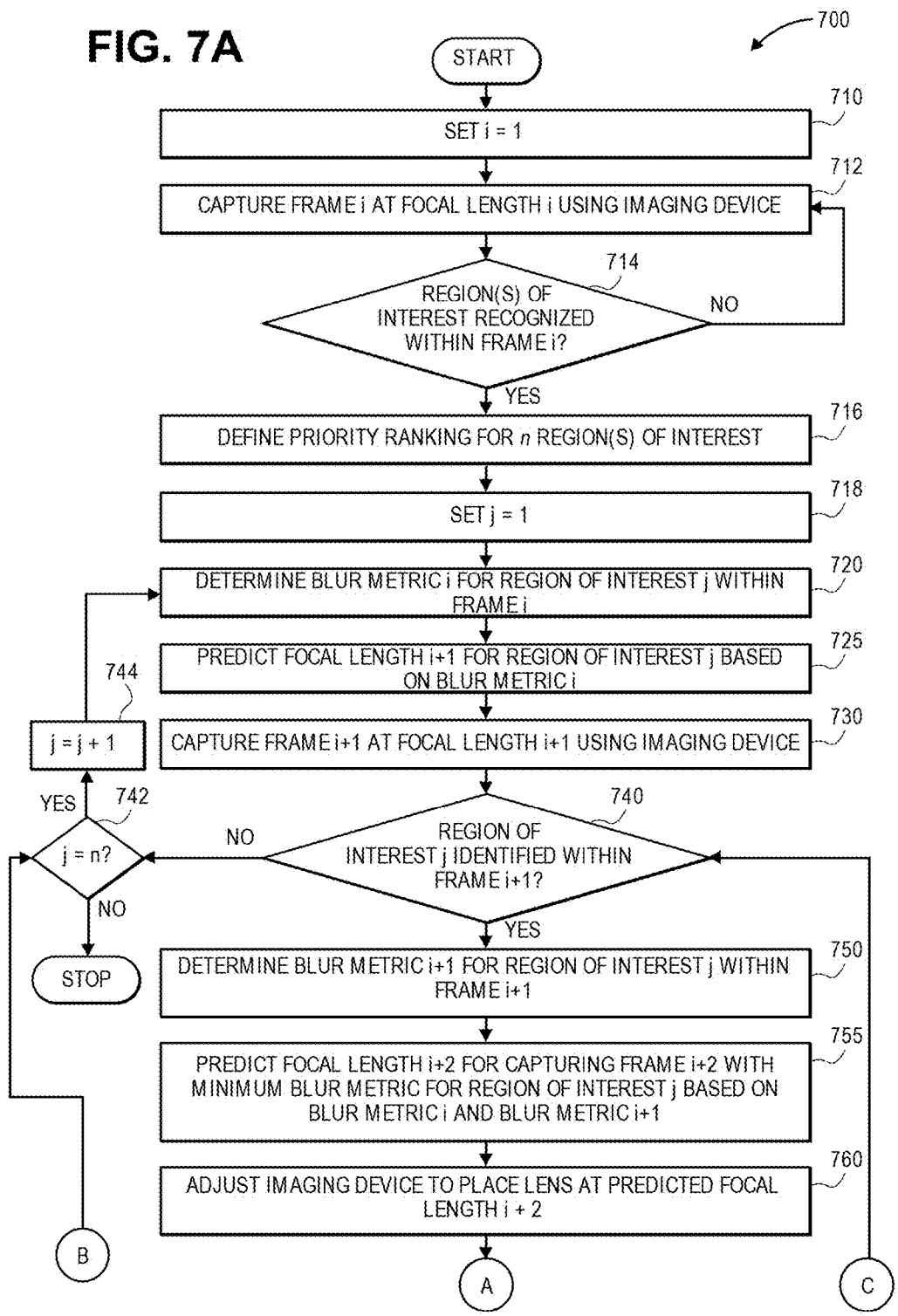

FOCUS SPECIFICATION AND FOCUS STABILIZATION

CROSS-REFERENCE TO RELATED APPLICATIONS

This application is a continuation of U.S. patent application Ser. No. 14/842,754, filed Sep. 1, 2015, the contents of which are incorporated by reference herein in their entirety.

BACKGROUND

Today, imaging devices such as video cameras are frequently used for conducting surveillance or monitoring operations. For example, video cameras are commonplace in financial settings such as banks or casinos, where money changes hands in large amounts or at high rates of speed. Video cameras are also often used to monitor the arrival or departure of goods or services in warehouses, fulfillment centers or other like facilities, as well as the travels of persons or objects in locations such as airports, stadiums or other dense environments, or the flow of traffic on one or more sidewalks, roadways or highways.

When conducting surveillance or monitoring operations, video cameras may be aligned and configured to capture imaging data such as still or moving images of actions or events within their respective fields of view, and information regarding the captured imaging data or the observed actions or events may be configured and subjected to further analysis in order to identify aspects, elements or features of the content expressed therein. Such video cameras may be provided alone or in groups, and programmed to recognize when an action or event has occurred, such as when a frame-to-frame analysis of video imagery suggests that a predetermined threshold has been exceeded or that a predetermined condition has been satisfied, or otherwise implies that the action or the event has occurred based on information or data captured by the video cameras.

In dynamic environments such as transportation centers or fulfillment centers in which diverse collections of people, objects or machines enter and exit from such environments at regular or irregular times or on predictable or unpredictable schedules, it is difficult to determine which portions of a field of view of an imaging device should be kept in focus, e.g., by adjusting one or more lenses or other components to place such portions within a depth of field of the imaging device, at a given time. In particular, where an imaging device has a fixed orientation, or where the field of view of the imaging device includes large numbers of people, objects or machines that have varying sizes or shapes and travel at varying velocities, determining a person, an object or a machine on which the imaging device should be focused, and on which of the people, objects or machines the imaging device need not focus, may be exceptionally challenging.

BRIEF DESCRIPTION OF THE DRAWINGS

FIGS. 7A and 7B are a flow chart of one process for focus specification or focus stabilization in accordance with embodiments of the present disclosure.

DETAILED DESCRIPTION

As is set forth in greater detail below, the present disclosure is directed to focus specification and focus stabilization. More specifically, the systems and methods of the present disclosure are directed to identifying semantically related image pixels, or semantic objects formed from such pixels, within fields of view of imaging devices, specifying such objects or pixels as regions of interest, and automatically focusing the imaging devices in order to place such regions or objects within an appropriate depth of field, and to render such regions or objects clearly within imaging data captured by the imaging devices. Such regions, pixels or objects may be identified manually, e.g., by a manual interaction with user interface or input/output device, or automatically through one or more probabilistic analyses of images or frames of imaging data as the imaging data is captured by the imaging devices. Once a region of interest has been identified, a plurality of images or frames (e.g., a burst) may be captured using an imaging device and the extent of blur or sharpness within such images or frames may be evaluated on any basis in order to determine an appropriate focal length for capturing a subsequent image or frame having a minimal extent of blur or a maximal extent of sharpness with respect to the region of interest. Thereafter, feedback or initialization information or data may be provided to the imaging device, which may be adjusted to position a lens at the appropriate focal length with respect to a sensor (e.g., a photosensitive surface having a plurality of pixel sensors), and the subsequent image or frame may be captured using the imaging device. The processes of identifying a region of interest, capturing images or frames including the region of interest, and analyzing such images or frames to identify appropriate focal lengths may be repeated, as necessary or desired, in order to evaluate the region of interest and/or to track semantically related pixels or one or more semantic objects over time within a field of view of the imaging device, e.g., by defining a vector based on the motion of such pixels or objects within the field of view and predicting their positions therein at one or more predetermined times in the future.

Figure 1:
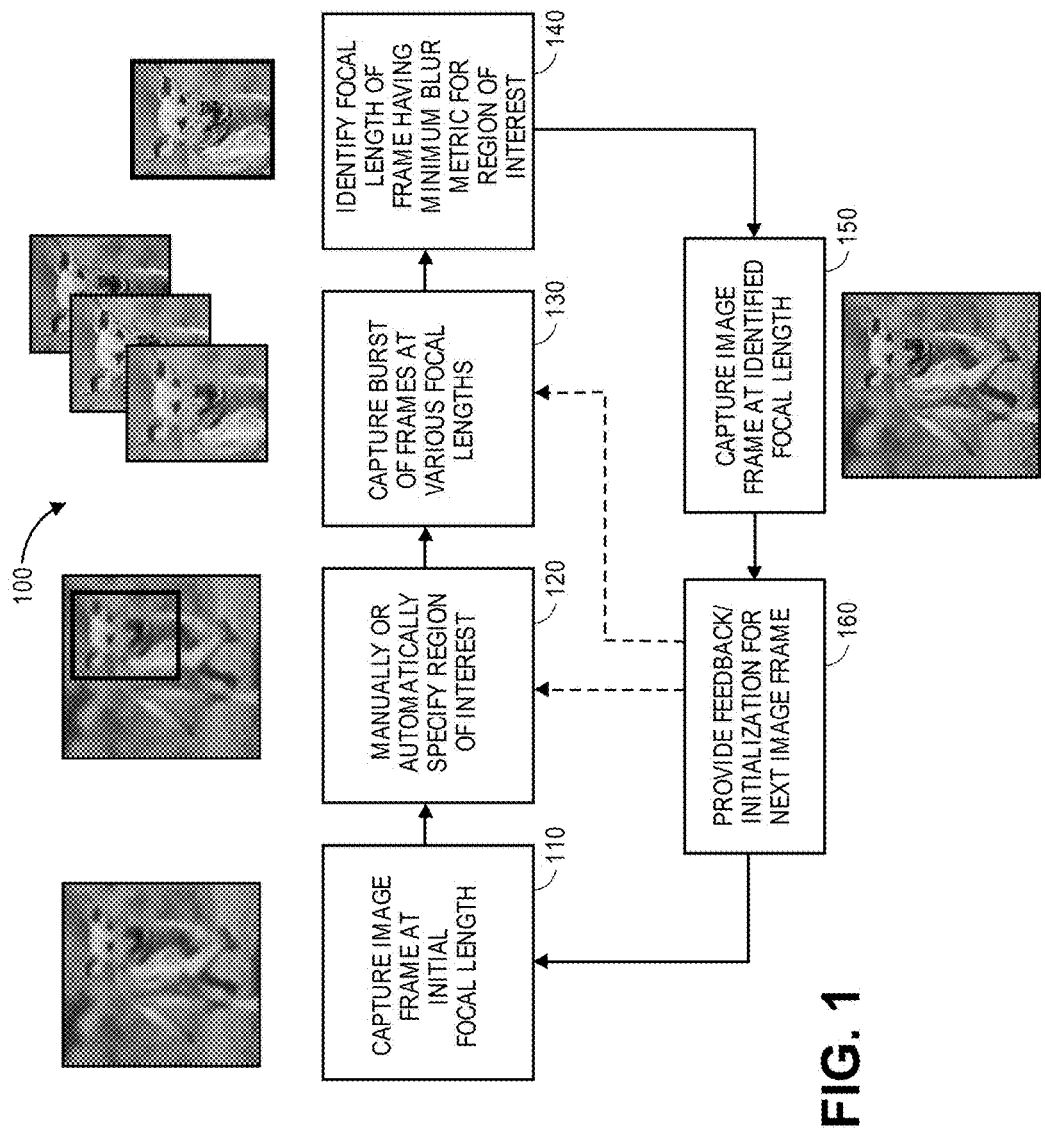
FIG. 1 is a flow diagram of one process for focus specification or focus stabilization in accordance with embodiments of the present disclosure.

Referring to FIG. 1, a flow diagram 100 of one process for focus specification or focus stabilization in accordance with embodiments of the present disclosure is shown. At box 110, an imaging device at an initial focal length captures an image frame of a field of view. The image frame may be captured at a random time, or in accordance with a predetermined schedule or basis. The initial focal length may be selected at random, or based on historical information or data, or any other available information regarding an environment in which the imaging device is provided.

At box 120, a region of interest is specified within the image frame. The region of interest may be identified manually, or automatically on one or more bases. In some embodiments, an abstract item may be automatically recognized within the image frame, e.g., in accordance with one or more detection algorithms or techniques, or an event may be recognized within the image frame, and the region of interest may be defined based on the abstract item or the event. Alternatively, in other embodiments, the region of interest may be manually specified, e.g., by contact with a portion of a user interface via a touchscreen, a pointing device (e.g., a mouse), a keyboard or another input/output device, or in any other manner.

At box 130, a burst of frames is captured at various focal lengths within the common field of view. The focal lengths for the frames of the burst may be selected on any basis, such as at random, in accordance with a predetermined priority ranking, or based on historical information or data, or any other available information or data regarding the environment in which the imaging device is provided. For example, where the image frame at box 110 is captured with a focal length of 1.1 meters, a blur metric of the image frame may be determined for the image frame, and the focal lengths of the image frames of the burst that are to be captured at box 130 may be selected based on the blur metric. Depending on the blur metric, the burst of frames could be captured at focal lengths of 1.0, 0.9 or 0.8 meters or, alternatively, at focal lengths of 1.2, 1.3 or 1.4 meters.

At box 140, a focal length of one of the frames of the burst having a minimum blur metric for the region of interest is determined. For example, in some implementations, for each of the pixels of the region of interest, a blur metric, or a measure, value, calculation or estimate indicative of the extent to which a pixel is blurry or sharp, may be determined based on information or data regarding a color or grayscale value associated with the pixel, or the colors or grayscale values associated with one or more other pixels surrounding the pixel. In some other implementations, based on the image frames of the burst, an image frame having a top "perceptual score" may be calculated for the region of interest, and the focal length associated with that image frame may be identified.

At box 150, an image frame is captured at the identified focal length, e.g., by readjusting a lens of the imaging device, as necessary, with respect to a photosensitive surface having a plurality of pixel sensors, and exposing the pixel sensors to light for a predetermined period of time (such as an exposure time defined by a shutter speed of the imaging sensor). The image frame captured at box 150 may be of the same level of resolution as one or more of the image frames captured in the burst at box 130 or, alternatively, at different levels of resolution. For example, in some embodiments, the image frames captured in the burst at box 130 may be of a relatively low level of resolution, while the image frame captured at box 150 at the focal length identified at box 140 may be of a high level of resolution. At box 160, feedback and/or initialization is provided to the imaging device, e.g., regarding the content of the image frame captured at box 150, such as a level of a blur metric or other indicator of the quality or clarity of the image frame, or a focal length calculated based on the content of the image frame, or any other relevant information or data for initializing the imaging device prior to the capture of another image frame, before returning to box 110, where another initial image frame is captured, and to box 120, where another region of interest is manually or automatically specified within the initial image frame. Alternatively, the process may return to box 120, where the region of interest may be manually or automatically specified within the image frame captured at box 150, or to box 130, where another burst of frames may be captured at various focal lengths determined based on the feedback provided at box 160.

Accordingly, as is shown in FIG. 1, the systems and methods of the present disclosure may be utilized to monitor an entire field of view of an imaging device for objects, humans, or other things, or evaluated to detect motion or movements of such objects, humans or things, within the field of view of the imaging device. A region of interest including one or more sets of semantically related image pixels, or semantic objects, within the field of view of one or more images or frames captured at discrete focal lengths may be defined, e.g., manually or automatically. Such images or frames may be captured individually, or collectively as a part of a burst or series, at focal lengths that are selected at random, in accordance with a predetermined schedule or scheme, or on any other basis. A measure of blur or sharpness of one or more of the images or frames in general, or the region of interest within the image or frame, may be determined. Subsequently, a focal length for capturing further imaging data, e.g., one or more subsequent images or frames, may be predicted based on the measure of the blur or sharpness of one or more of the previously captured images or frames. The imaging device may be adjusted accordingly, and one or more images or frames may be captured with the imaging device at the predicted focal length.

Thus, in accordance with the present disclosure, an imaging device may automatically monitor a region of interest by capturing imaging data at various focal lengths, and processing such imaging data to determine focal lengths for automatically focusing the imaging device to capture subsequent images with enhanced clarity. The systems and methods disclosed herein thus provide a deterministic means for selecting focal lengths for images to be captured based on the extent of blur or sharpness within images that have already been captured, and how the extent of the blur or the sharpness is changing or has changed within such images. Unlike other autofocusing systems or techniques, which are generally directed to maintaining specific spatial regions of an imaging device's field of view at a sufficient level of clarity, the systems and methods of the present disclosure are directed to automatically identifying and recognizing content of imaging data, and maintaining regions of interest including the identified and recognized content at a sufficient level of clarity by manipulating a focal length of the imaging device with which the imaging data was captured. Therefore, the systems and methods of the present disclosure may, through regular and/or repeated iterations, determine focal lengths for capturing a subsequent image or frame in instances when a region of interest is recognized within a prior image or frame, and in instances when the region is not so recognized, based on the extent of blur or sharpness within the prior image or frame. Information or data regarding such focal lengths may be maintained in a lookup table, a file or another record maintained in a data store, recalled when an image or frame having a particular blur metric is captured, and utilized to reconfigure an imaging device to capture another image or frame.

Moreover, an environment in which an imaging device is provided may be mapped into predicted focal lengths, such that objects at discrete locations within the environment may be clearly placed into focus by adjusting the imaging device to a predicted focal length corresponding to the discrete location. For example, where an imaging device is configured to capture imaging data regarding an urban intersection, it is known that the streets defining the intersection will feature automobiles, trucks, bicycles or other vehicles, and that humans or other animals may be found along sidewalks adjoining such streets, or on crosswalks traversing such streets. Therefore, information regarding focal lengths for adjusting an imaging device to capture imaging data regarding vehicles at specific locations within such streets, or humans or other animals along such sidewalks or crosswalks, may be stored in a lookup table, a file or another record maintained in a data store and recalled when a region of interest within such locations is defined based on the content of the imaging data.

Imaging data in the form of visual imaging data, depth imaging data, infrared imaging data, radiographic imaging data, or any other type or form of imaging data, may be captured using one or more imaging devices such as digital cameras, depth sensors, range cameras, infrared cameras or radiographic cameras. Such devices may generally operate by capturing light that is reflected from objects, and by subsequently calculating or assigning one or more quantitative values to aspects of the reflected light, e.g., image pixels, generating an output based on such values, and storing such values in one or more data stores. For example, a digital camera may include one or more image sensors (e.g., a photosensitive surface with a plurality of pixel sensors provided thereon), having one or more filters associated therewith, and such sensors may detect information regarding aspects of any number of image pixels of the reflected light corresponding to one or more base colors (e.g., red, green or blue) of the reflected light, or distances to objects from which the light was reflected. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB ("red-green-blue") color model, in which the portions of red, green or blue in a image pixel are expressed in three corresponding numbers ranging from 0 to 255 in value, or a hexadecimal model, in which a color of a image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated a label or labels according to one or more machine learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure are directed to novel techniques or procedures for capturing imaging data regarding regions of interest within a field of view of an imaging device. More specifically, one or more of the systems and methods disclosed herein may be utilized to receive a selection or designation of a region of interest, or automatically identify the region of interest, and capture bursts of images or frames regarding the region of interest at various focal lengths. The images or frames may be evaluated in order to identify the image or frame that is most sharp, or least blurry, e.g., by calculating a blur metric for at least the regions of interest, if not the entire images or frames as a whole, and determining a focal length within which the region of interest appears most clearly or with the least amount of blur. Based on information regarding the presence or absence of blur within images or frames captured by the imaging device, an appropriate focal length for capturing a subsequent image or frame including the region of interest may be identified. The imaging device may then be adjusted in a manner consistent with the appropriate focal length, e.g., by manually or automatically repositioning a lens with respect to an image sensor, prior to capturing the subsequent image or frame. Moreover, in accordance with the present disclosure, the imaging devices from which imaging data is captured may be stationary or mobile, such that the field of view and the depths of field of such imaging devices may change based on the positions or orientations of components of the imaging device, including the lens and/or one or more sensors. Additionally, the content of the subsequent image or frame may be evaluated in any manner to identify information or data that may be used to further focus the imaging device prior to capturing additional images or frames of imaging data.

In some embodiments, the systems and methods of the present disclosure may perform region-level specification and stabilization-based approaches for capturing imaging data, including still or moving images, or any other type or form of imaging data. Regions of interest within images or frames of imaging data may be defined as sets of semantically related image pixels within a field of view of an imaging device (e.g., digital cameras, depth sensors, range cameras, infrared cameras or radiographic cameras), and such regions may include, but are not limited to, faces, objects (e.g., static or dynamic objects) or humans, and feature either background objects, foreground objects, or both background and foreground objects. The regions of interest may be identified manually or automatically, and the imaging device may intelligently maintain a level of focus on a region of interest specified by the user thereafter.

The plurality of images or frames may be captured in bursts, e.g., in a series of shutter actuations over a brief period of time, and at a plurality of different focal lengths, for a common field of view. An evaluation of the contents of such images or frames thus provides an indication of the presence or absence of semantic objects within a region of interest, to varying degrees of clarity. The image or frame having the highest probability of expressing relevant information to the greatest level of clarity may thus be selected and evaluated, and a focal length for capturing another image or frame may be determined or calculated based on such contents.

A region of interest within one or more images or frames may be manually or automatically identified in any manner. For example, a user of one or more general-purpose or specifically purposed computers may identify or designate one or more such regions through a user interface, e.g., by contact with one or more portions of a touchscreen display, by defining the regions with a mouse or other pointing device, by entering information regarding the regions with a keyboard or other data entry device, or in any other manner. In some embodiments, a plurality of regions of interest may be automatically identified within an image or frame, and a user interface including the image or frame that identifies the regions of interest (e.g., in an overlay having one or more selectable elements, or with one or more other interactive identifiers or features) may be displayed to a user, who may confirm that some, all or none of the automatically regions of interest is actually of interest to the user.

Additionally, some of the systems and methods disclosed herein may be configured to maintain a designated region of interest in focus on a regular basis, or to periodically check or evaluate pixels within the region of interest on a regular or sporadic basis. Alternatively, a region of interest may be defined by identifying a semantic object of interest in the abstract, e.g., any human or other predetermined object that appears within an image or frame (such as a vehicle bearing a registration plate or license plate, an autonomous robot, a box or other container, a specific article or piece of equipment, or an object bearing a predetermined marked identifier such as a one-dimensional or two-dimensional bar code). When such a semantic object appears within a field of view and is recognized in one or more images or frames, a region of interest including the semantic object may be defined, and the region of interest may be tracked in subsequent images or frames, e.g., by defining a vector based on the motion of the semantic object within the field of view and predicting a position of the semantic object at one or more predetermined times in the future.

Moreover, a region of interest may also be defined based on a specific event observed and recognized within one or more images or frames, e.g., an action, an activity, a motion or other kind of movement, which may automatically designate portions of such images or frames depicting the specific event as a region of interest. For example, motion associated with a vehicle appearing within a scene, an object falling off of a shelf, or a specific human action or gesture may be observed within an image or frame captured by an imaging device and recognized as such, e.g., according to one or more machine learning classifiers, algorithms or techniques, and a region of interest may be defined accordingly. Thereafter, the imaging device may be adjusted accordingly to define one or more appropriate focal lengths, as necessary, to ensure that the region of interest is maintained in focus in subsequent images or frames. Any other classification strategies, e.g., one or more automated algorithms or techniques that utilize feature, edge or object detection principles, may be utilized to automatically define and track regions of interest, and the contents thereof, in one or more subsequent frames, or to identify one or more focal lengths associated with rendering such regions of interest in a least blurry, and most clear, manner.

In this regard, the systems and methods of the present disclosure may enable imaging devices to mimic the human eyes, which operate subject to several small movements, known as saccades or saccadic eye movements. A fovea includes tens of thousands of photoreceptors that change their position every two hundred to three hundred milliseconds, and saccadic eye movements may redirect the fovea of a retina from one point of interest to another at a rate of approximately three to four movements per second. By some estimates, saccades occur in most humans three to four times per second. Such movements enable a human eye to capture data not only from a fovea having a width of a handful of degrees but also from a visual field of view of approximately two hundred degrees (200°).

By specifying a region of interest within a field of view, e.g., manually or automatically, the systems and methods of the present disclosure may cause an imaging device to be automatically focused, such as by repositioning a lens or an imaging sensor, in order to capture high-quality video streaming data. Such systems and methods enable imaging devices to be contextually aware of the imaging data that they are capturing, and ensure that such regions of interest, and any objects therein, are captured in imaging data of the highest practicable or desirable quality. For example, in some embodiments, one or more low-resolution images of a field of view of an imaging device may be captured and evaluated in order to determine an appropriate focal length for capturing high-resolution images of a region of interest within the field of view.

In this regard, image pixels within a region of interest may be kept in focus using a blur metric, a perceptual score, or another quantitative or qualitative measure. In order to maintain an imaging device in focus, a focal length at which the blur metric is minimized (or the perceptual score is maximized) for a region of interest may be determined, the imaging device may be adjusted to place a lens and an imaging sensor at the focal length with respect to one another, and imaging data may be captured using the imaging device. For example, a blur metric may be computed for one or more regions of interest using a weighted sum of variances of Laplacian, a sum of modified Laplacian, or outputs from a Tenengrad operator or a modified Tenengrad operator for each of the image pixels within the region of interest.

As another example, a perceptual score that truly represents perceptual quality of images or imaging data captured using an imaging device, thereby determining whether the images or the imaging data may be utilized for image-based object detection, recognition, or classification in large settings, may also be calculated for one or more regions of interest. A perceptual score may be calculated by any statistical method, e.g., a linear regression model, which utilizes parameters that may be determined using a training set of imaging data, and defined using any type, form or number of descriptor statistics or other relevant information. For example, a properly trained linear regression model may consider any type or form of imaging data and return a quantitative perceptual score that aggregates the impact of the individual aspects of such imaging data on overall imaging quality. An image having a higher perceptual score than another image, for example, may be deemed to be of higher quality than the other image. Conversely, an image having a lower perceptual score than another image may be deemed to be of lower quality than the other image. The perceptual score may thus be used to determine whether an image is suitable for use in a given application, e.g., whether the image clearly and accurately depicts subjects appearing in a field of view of an imaging device, such as by comparing the perceptual score to a relevant minimum threshold.

Such values or descriptors may be computed or determined with little computational overhead by any type or form of computing device, including but not limited to one or more processors, integrated circuits (e.g., field-programmable gate arrays or systems-on-chips) or other components provided on an imaging device, or one or more other processors or other components associated with an external imaging data processing system.

The systems and methods of the present disclosure may thus enable a single imaging device, or multiple imaging devices, to persistently monitor an environment by periodically capturing images or frames and evaluating such frames to determine whether one or more semantically related pixels, or semantic objects formed from such pixels, are present within a region of interest, and to automatically focus such imaging devices in order to place the region of interest or such pixels or objects within an appropriate depth of field, or to render such regions or objects clearly within imaging data captured thereby. Where two or more regions of interest or two or more semantic objects are identified, the order or rate at which such semantic objects may be imaged may be determined in any manner. For example, where a field of view of an imaging device is known to include regions of interest having a diverse set of activities that may feature multiple objects in motion, the imaging device may dynamically and repeatedly change the level of focus (e.g., the focal length) of the imaging device in order to capture different regions of interest within the field of view. Ranking or ordering the various regions of interest, or determining which of the regions of interest should be placed in focus, and how often, may be determined based on a relevance score, or an importance score, calculated for each of the various regions.

Such a relevance score, or the importance score, may be calculated in any manner or on any basis. In some embodiments, the relevance score or importance score may rank or order specific objects within a scene as high-interest, or high-relevance, to an end use or application. For example, where an imaging device is configured to monitor activity for security purposes, license plates adorned by automobiles, faces or specific apparel at a given entrance may have a particularly high level of interest or relevance. Similarly, where an imaging device is configured to monitor fulfillment center operations, items having high levels of reflectance (including potentially fragile items, e.g., items made of glass) that are located in bins or on a floor, items bearing bar codes (e.g., one-dimensional or two-dimensional bar codes, such as QR codes) may be identified within images and designated as having a substantially high level of priority for focusing purposes.

In still other embodiments, where a region includes two or more of an item, and where only one item is expected, the region may be prioritized accordingly. Moreover, regions may be prioritized based on item size (e.g., regions having smaller items may be ranked at a higher level of priority than regions having larger items), item velocity (e.g., regions having items moving at higher velocities ranked at a higher level of priority than regions having items moving at lower velocities), item relevance (e.g., regions having items or humans near a center of an image designated at higher levels of priority than regions having items or humans near a peripheral or border of the image), or item content (e.g., a priority level may be assigned to regions having features such as particular faces or items of specific colors or shapes), or based on any other intrinsic factor.

Similarly, regions may also be prioritized based on actions occurring therein. For example, regions of a field of view in which specific actions or activities are expected, including regions of a fulfillment center where picking, stowing, packing, unpacking, scanning or loading of items are slated to occur, may be assigned priority levels consistent with characteristics of such activities. Likewise, regions may be prioritized on a temporal basis, e.g., in regions where specific activity is occurring at particular times, or where an anomaly is observed within imaging data captured at a given time (such as after-hours or at times when a region is expected to be devoid of activity), such regions may be prioritized accordingly. Finally, regions may be prioritized on a statistical basis. For example, where a region experiences an abnormally high or an abnormally low level of activity, or abnormally high or low rates of change in activity, the region may be prioritized accordingly based on a frequency of activity within the region.

In some embodiments, the systems and methods of the present disclosure may be utilized in connection with automated machines having one or more imaging devices for executing various applications, including but not limited to autonomous mobile robots or unmanned aerial vehicles, which may be guided to specific locations or in the performance of specific tasks based on imaging data captured using such imaging devices. For example, in some embodiments, an autonomous mobile robot may be trained to recognize semantically related pixels or semantic objects corresponding to a region of interest within a fulfillment center such as one or more storage units (e.g., aisles, rows, bays, shelves, slots, bins, racks, tiers, bars, hooks or cubbies); one or more items that are to be stored within such storage units, maintained therein or removed therefrom; or one or more workers, regions or stations within the fulfillment center, to maintain the region of interest within focus as the autonomous mobile robot is in motion, and to execute one or more functions accordingly. In other embodiments, an unmanned aerial vehicle may be trained to recognize semantically related pixels or semantic objects corresponding to a region of interest at an origin or destination (e.g., a zone for taking off or landing identified with one or more markings or intrinsic features), to maintain the region of interest within focus as the unmanned aerial vehicle changes its position, and to execute one or more functions accordingly.

Figure 2:
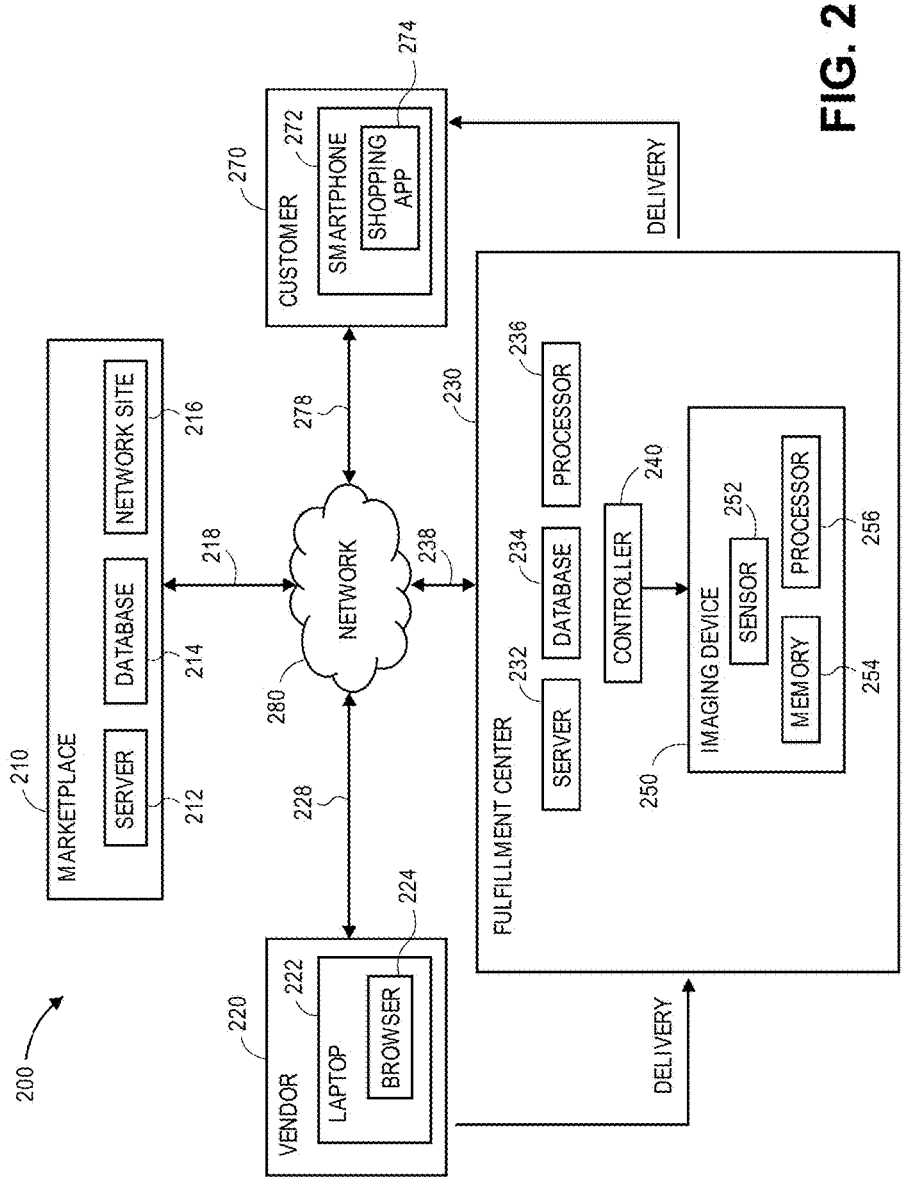
FIG. 2 is a block diagram of components of one system for focus specification or focus stabilization in accordance with embodiments of the present disclosure.

Referring to FIG. 2, a block diagram of components of one system 200 for focus specification or focus stabilization in accordance with embodiments of the present disclosure is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources (e.g., manufacturers, merchants, sellers or vendors, such as the vendor 220) available for download, purchase, rent, lease or borrowing by customers using a networked computer infrastructure, including one or more physical computer servers 212 and databases (or other data stores) 214 for hosting a network site (e.g., a web site) 216. The marketplace 210 may be physically or virtually associated with one or more storage or distribution facilities, including but not limited to the fulfillment center 230. The network site 216 may be implemented using the one or more servers 212, which connect or otherwise communicate with the one or more databases 214 as well as the network 280, as indicated by line 218, through the sending and receiving of digital data. The servers 212 may cause the display of information associated with the network site 216 in any manner, e.g., by transmitting code such as Hypertext Markup Language (HTML), over the network 280 to another computing device that may be configured to generate and render the information into one or more pages and to display such pages on a computer display of any kind. Moreover, the database 214 may include any type of information regarding items that have been made available for sale through the marketplace 210, or ordered by customers from the marketplace 210, including but not limited to names and/or images of items; prices of the items; item numbers, part numbers or other identifiers for the items; dimensions or features of the items; as well as customer ratings or reviews of the items., or any data regarding such customers.

The vendor 220 may be any entity or individual that intends to make one or more items available to customers, such as the customer 270, by way of the marketplace 210. The vendor 220 may operate one or more order processing and/or communication systems using a computing device such as a laptop computer 222 (as well as a tablet computer, a smartphone, a desktop computer or any other type or form of computing device) and/or software applications such as a browser (e.g., a web browser) 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230, or to the customer 270 or other destinations (not shown). Additionally, the vendor 220 may receive one or more items from manufacturers, merchants, sellers or other vendors (not shown), and may deliver one or more of such items to locations designated by the marketplace 210, such as the fulfillment center 230, for fulfillment and distribution to customers, or to the customer 270 directly. Furthermore, the vendor 220 may perform multiple functions. For example, the vendor 220 may also be a manufacturer, a merchant or a seller of one or more other items, and may also offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be, or may be operated by, a manufacturer, a merchant, a seller or a vendor.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236, that may be provided in the same physical location as the fulfillment center 210, or in one or more alternate or virtual locations, e.g., in a "cloud"-based environment. The fulfillment center 230 may also include stations for receiving, storing and distributing items to customers, such as one or more receiving stations, storage areas and distribution stations. The fulfillment center 230 further includes a computer-based controller 240 and an imaging device 250.

The controller 240 may be any type or form of electronic device or system configured to control the operation of the imaging device 250 and/or any other aspect of operations within the fulfillment center 230. The controller 240 may be in communication with one or more workers within the fulfillment center 230, or the various facilities and other components of the fulfillment center 230. The controller 240 may also be associated with one or more other computing devices or machines, and may communicate with the marketplace 210, the vendor 220 or the customer 270 over the network 280, as indicated by line 238, through the sending and receiving of digital data.

The controller 240 may generate instructions or commands based on information received from the imaging device 250, the server 232, the processor 236, or any other external computing device via the network 280. For example, the controller 240 may transmit one or more control signals to components associated with one or more aspects of the imaging device 250, including but not limited to components for operating, reconfiguring, repositioning or reorienting the imaging device 250 (e.g., lenses, shutters, or the like). The controller 240 may be associated with any form of motors, power sources or other components for operating the various machines or apparatuses within the fulfillment center 230, including but not limited to the imaging device 250.

The imaging device 250 may be any form of optical recording device that may be used to photograph or otherwise record imaging data of structures, facilities or other elements within the fulfillment center 230, as well as the items within the fulfillment center 230, or for any other purpose. As is shown in FIG. 2, the imaging device 250 may include one or more sensors 252, memory or storage components 254 and processors 256, and such sensors, memory components or processors may further include one or more photosensitive surfaces, filters, chips, electrodes, clocks, boards, timers or any other relevant features (not shown). Such imaging devices 250 may capture imaging data in the form of one or more still or moving images of any kind or form, as well as any relevant audio signals or other information, within one or more designated locations within the fulfillment center 230, and may be connected to the server 232 or with one another by way of a wired or wireless connection that may be dedicated or comprise all or part of an internal network (not shown). Additionally, the imaging device 250 may be adapted or otherwise configured to communicate with the marketplace 210 or the marketplace server 212, the vendor 220 or the vendor laptop 222 or the customer 270 or customer smartphone 272, or with one or more other imaging devices (not shown), or to access one or more other computer devices by way of the network 280. Although the fulfillment center 230 of FIG. 2 includes a single box corresponding to one imaging device 250, those of ordinary skill in the pertinent arts will recognize that any number or type of imaging devices may be provided in accordance with the present disclosure, including but not limited to digital cameras, depth sensors or range cameras, infrared cameras, radiographic cameras or other optical sensors.

The fulfillment center 230 may also include one or more workers (not shown), who may be any designated personnel tasked with performing one or more tasks within the fulfillment center 230. Such workers may handle or transport items (e.g., any type or form of good, product, media or other tangible consumer article) within the fulfillment center 230, or operate one or more pieces of equipment therein (not shown). The workers may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices. The fulfillment center 230 may further include one or more autonomous mobile robots (not shown) for performing one or more of the tasks traditionally associated with human workers, including but not limited to the tasks referenced above.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities, for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Alternatively, an item received at a receiving station of the fulfillment center 230 may be transferred directly to a distribution station for further processing, or "cross-docked," without first being placed into storage in an intermediate storage area.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," or a "customer," or like terms, may be automated steps performed by their respective computer systems, or implemented within software modules (or computer programs) executed by one or more general purpose computers. Moreover, those of ordinary skill in the pertinent arts would recognize that references to process steps or actions described herein as being performed by or relating to a "vendor" could also be performed by or relate to a manufacturer, a merchant or a seller, or another source of items. Those of ordinary skill in the pertinent arts would also recognize that process steps described as being performed by a "marketplace," a "vendor," a "fulfillment center," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
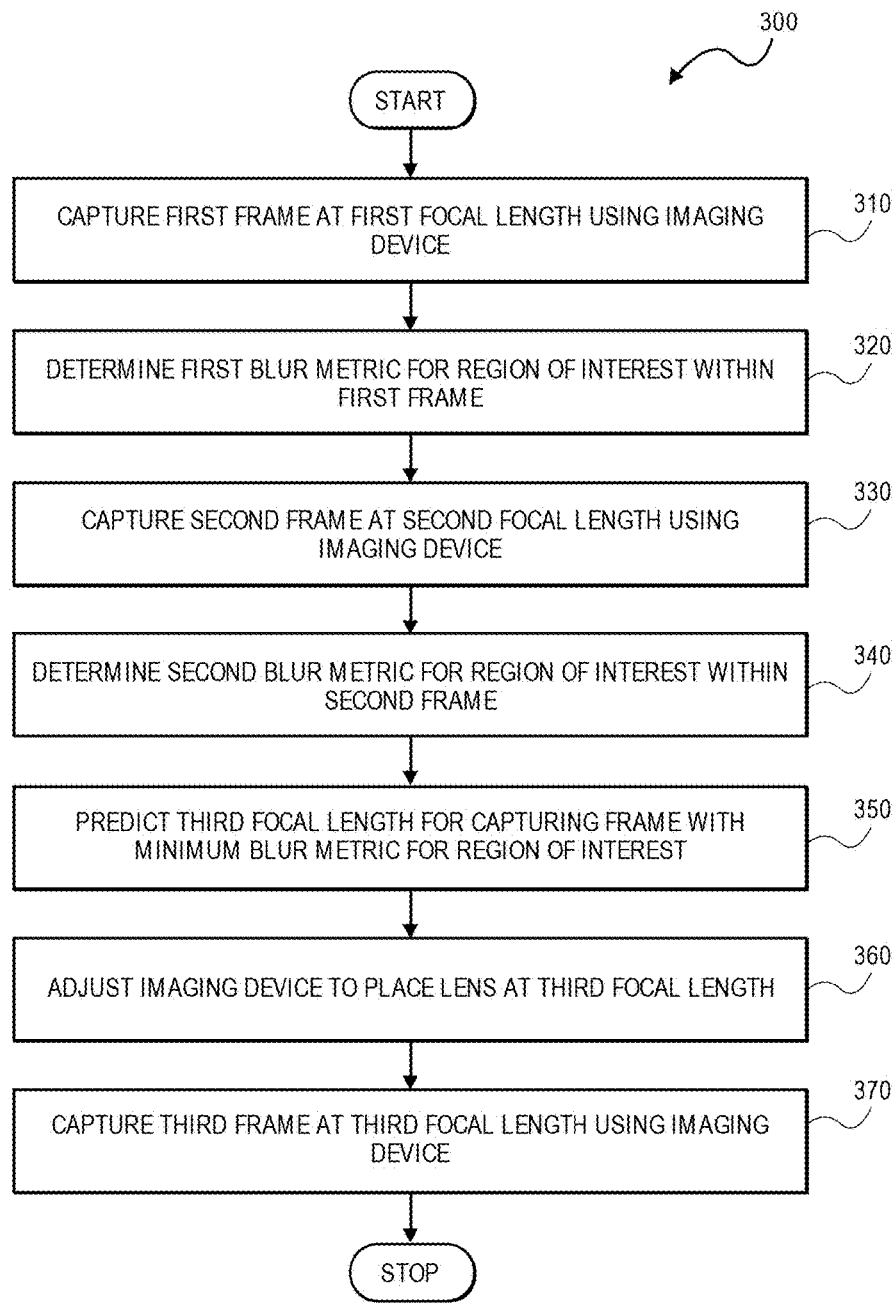
FIG. 3 is a flow chart of one process for focus specification or focus stabilization in accordance with embodiments of the present disclosure.

As is discussed above, the systems and methods of the present disclosure may be directed to determining blur metrics and generating blur images based on such metrics, and, in accordance with the present disclosure, such blur metrics and blur images may be utilized for any purpose. Referring to FIG. 3, a flow chart 300 representing one embodiment of a process for focus specification and focus stabilization in accordance with embodiments of the present disclosure is shown.

At box 310, a first frame of imaging data is captured at a first focal length using an imaging device. A lens of the imaging device may be provided at a default distance from an imaging sensor (e.g., a default focal length), or at a distance associated with one or more imaging data previously captured using the imaging device. At box 320, a first blur metric is determined for a region of interest within the first frame. A blur metric (or blur value) may be calculated for a plurality of pixels within a region of interest, and may be indicative of a level of blur or sharpness of the portion of the imaging data therein. Additionally, blur metrics may be calculated according to any algorithms or techniques. For example, a blur metric may be calculated based on a weighted sum of a variance of a Laplacian operator output, a sum of modified Laplacians, an output of a Tenengrad operator, or an output of a modified Tenengrad operator. The region of interest may be selected or identified manually, e.g., through one or more user interactions with a user interface and/or an input/output device, such as a touchscreen, a pointing device or a keyboard, or automatically, e.g., according to one or more algorithms or machine-learning tools for recognizing features such as edges, contours, outlines, colors, textures, silhouettes, shapes or other elements within imaging data.

At box 330, a second frame is captured at a second focal length using the imaging device. The second focal length may be equal to the first focal length, e.g., where the lens is not adjusted with respect to the imaging sensor between the capture of the first frame and the capture of the second frame, or the second focal length may be different from the first focal length, e.g., where the lens is adjusted in some manner prior to the capture of the second frame. At box 340, a second blur metric is determined for the region of interest within the second frame. Preferably, the second blur metric is calculated according to the same algorithms or techniques by which the first blur metric was calculated.

At box 350, a third focal length for capturing a frame with a minimum blur metric for the region of interest, e.g., a minimum level of blur within the region of interest, is predicted. The third focal length may be predicted based at least in part on one or more of the first focal length, the first blur metric, the second focal length, the second blur metric, or any information or data used or calculated in order to determine a location of the region of interest within a frame, or to track the location of the region of interest between frames. For example, where a position and/or velocity of an object appearing within the region of interest in the first frame and/or the second frame is estimated or determined, the predicted location of the object at a third time may be determined, and a focal length that would place the predicted location within a depth of field at the third time may be predicted. In some embodiments, a vector representing the location of the object within the field of view of the imaging device may be defined and used to predict the location of the object at a time in the future.

At box 360, the imaging device is adjusted to place the lens at the third focal length with respect to the imaging sensor. For example, the lens may be manually or automatically repositioned as necessary (e.g., using one or more motors) to place the lens in a location with respect to the imaging sensor that is predicted to result in the capture of a frame of imaging data having a minimum level of blur. At box 370, a third frame is captured at the third focal length using the imaging device, and the process ends.

As is discussed above, the systems and methods of the present disclosure may be utilized to identify regions of interest within fields of view of imaging devices and to systematically capture imaging data regarding such regions at different focal lengths, e.g., by adjusting a position of a lens with respect to a photosensitive surface of an imaging sensor, and calculating or determining one or more quantitative or qualitative measures regarding a region of interest within such imaging data. Based on such measures, an ideal focal length for capturing imaging data regarding a region of interest with minimum blur and/or maximum clarity may be calculated or determined, and the imaging device may be configured to capture the imaging data at the ideal focal length.

Figure 4A:
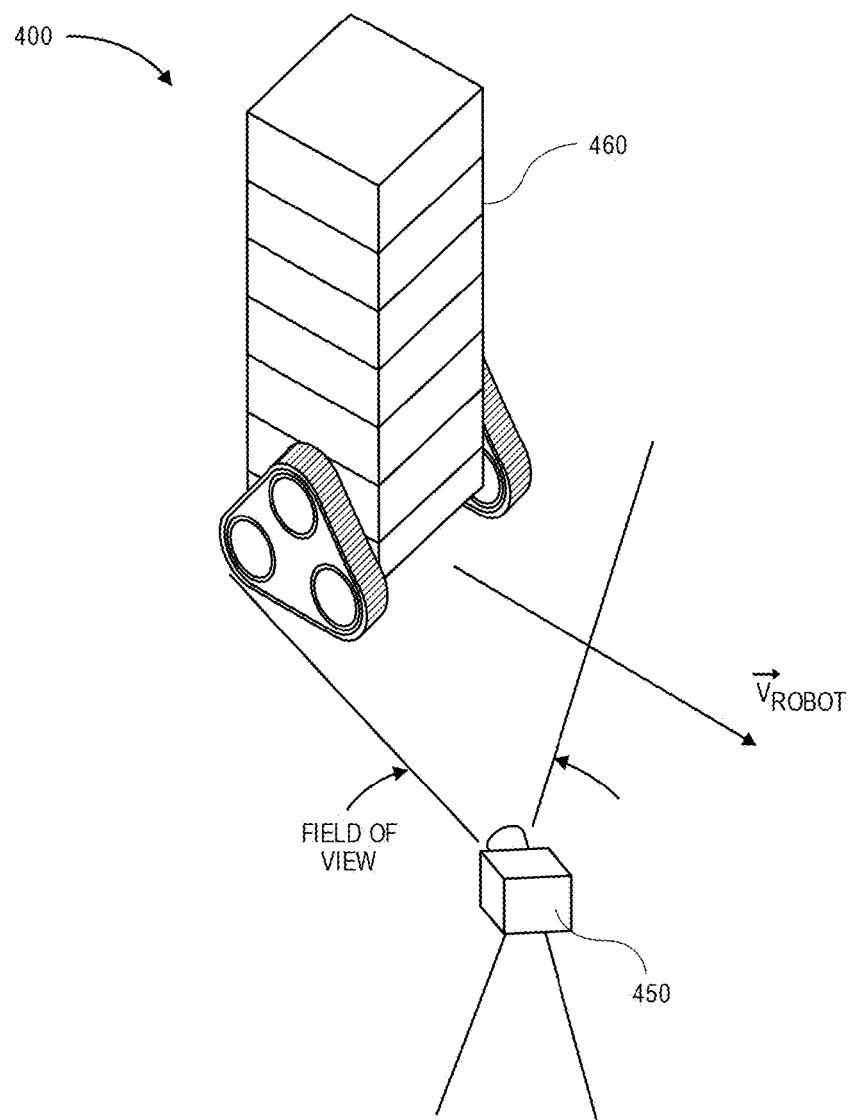
FIG. 4A and FIG. 4B are views of aspects of one process for focus specification or focus stabilization in accordance with embodiments of the present disclosure.
Figure 4B:
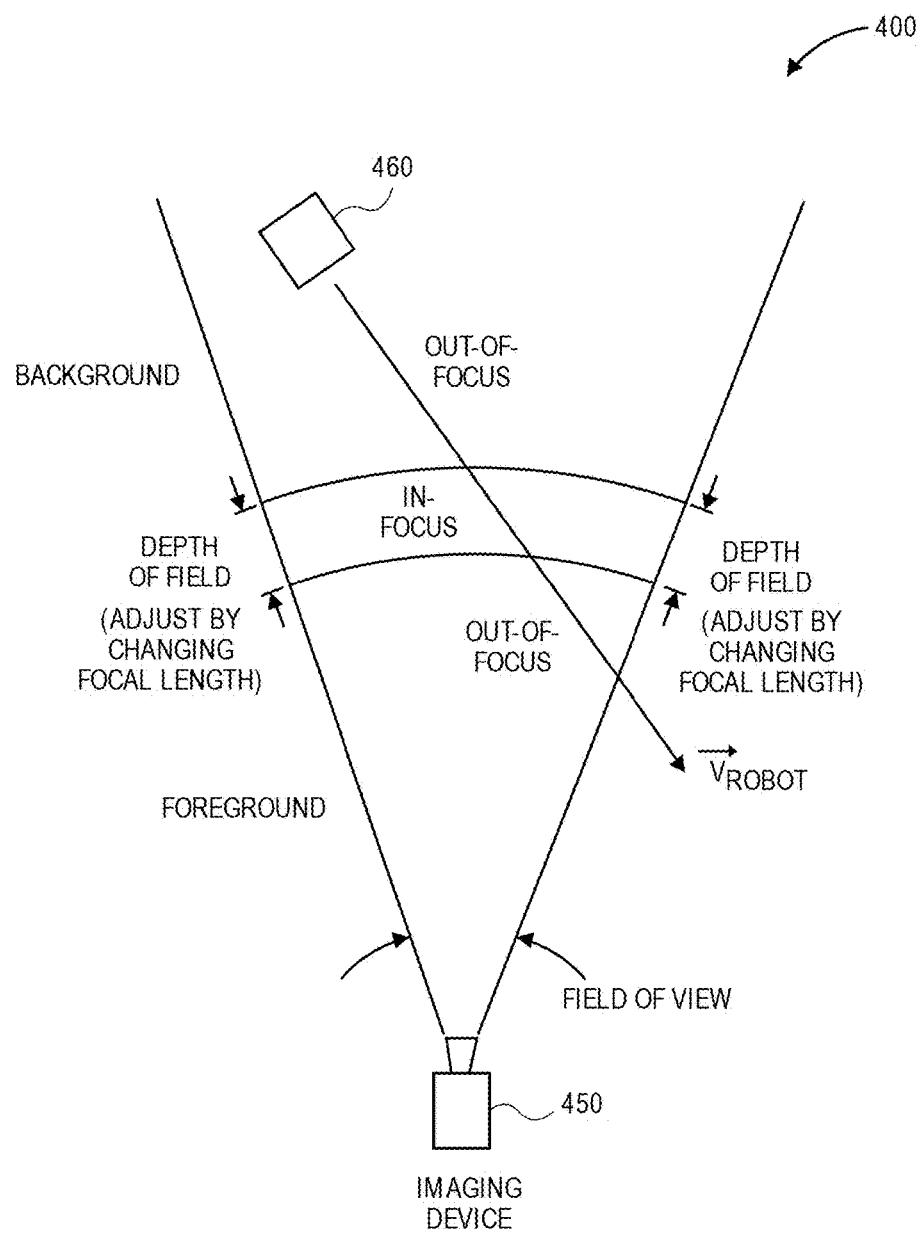

Referring to FIGS. 4A and 4B, a system 400 including an imaging device 450 and an autonomous mobile robot 460 is shown. As is shown in FIG. 4A, the autonomous mobile robot 460 is passing through a field of view of the imaging device 450 at a velocity VROBOT. As is shown in FIG. 4B, the autonomous mobile robot 460 may begin traveling at the velocity VROBOT beyond the depth of field (e.g., the distance within the field of view where the clarity and focus is sufficiently sharp), and may enter into and depart from the depth of field at the velocity VROBOT. In accordance with the present disclosure, the imaging device 450 may adjust its focal length and capture imaging data (e.g., bursts or series of images or frames) within the field of view until a region of interest, e.g., a semantic object representative of the autonomous mobile robot 460, is identified within one or more of the images or frames. One or more qualitative or quantitative measures, e.g., blur metrics or perceptual scores, may be determined for such images or frames in which the region of interest is identified. From such measures, an ideal focal length for capturing a subsequent image or frame of the region of interest may be determined. The imaging device 450 may be adjusted accordingly, and the subsequent image or frame may be captured with the imaging device 450 at the ideal focal length. Moreover, the imaging device 450 may be stationary or mobile. In some embodiments, the imaging device 450 may be provided on another autonomous mobile robot (not shown).

For example, referring again to FIG. 4B, a burst of images or frames may be captured of the field of view of the imaging device 450 at various focal lengths, and the content of each of the images or frames of the burst may be evaluated. Where a region of interest including the autonomous mobile robot 460 is recognized within one or more of the images or frames, a blur metric, a perceptual score or another measure of the blur or sharpness for each of the images or frames in which the region of interest appears may be determined. Based on such blur metrics, perceptual scores or other measures, an ideal focal length may be predicted for capturing a subsequent image or frame including the region of interest at a minimum level of blur or a maximum level of sharpness or clarity. For example, where the region of interest is identified in an image or frame captured at the focal length of the imaging device 450 as shown in FIG. 4B, and a blur metric regarding the region of interest within the image or frame may be calculated. Based on the blur metric, the focal length may be adjusted to cause the autonomous mobile robot to appear within the depth of field of the imaging device 450, thereby enabling sufficiently clear images or frames of the autonomous mobile robot 460 to be captured thereafter.

In some embodiments, the images or frames of the burst may be captured at a first level of resolution and, once an ideal focal length is identified, and the imaging device 450 is adjusted accordingly, an image or a frame may be captured at a second level of resolution, e.g., where the second level of resolution is a high level of resolution and the first level of resolution is a comparatively low level of resolution, and with the imaging device 450 configured at the ideal focal length. Moreover, those of ordinary skill in the pertinent arts will recognize that processes for identifying may be cyclic or repetitive in nature. For example, when an image or a frame is captured with an imaging device configured at an ideal focal length, or at a focal length based on blur metrics or other measures determined based on imaging data previously captured by the imaging device, a blur metric may be calculated for the image or the frame, and the imaging device may be further adjusted to a new focal length for capturing an other image or frame accordingly.

Figure 5:
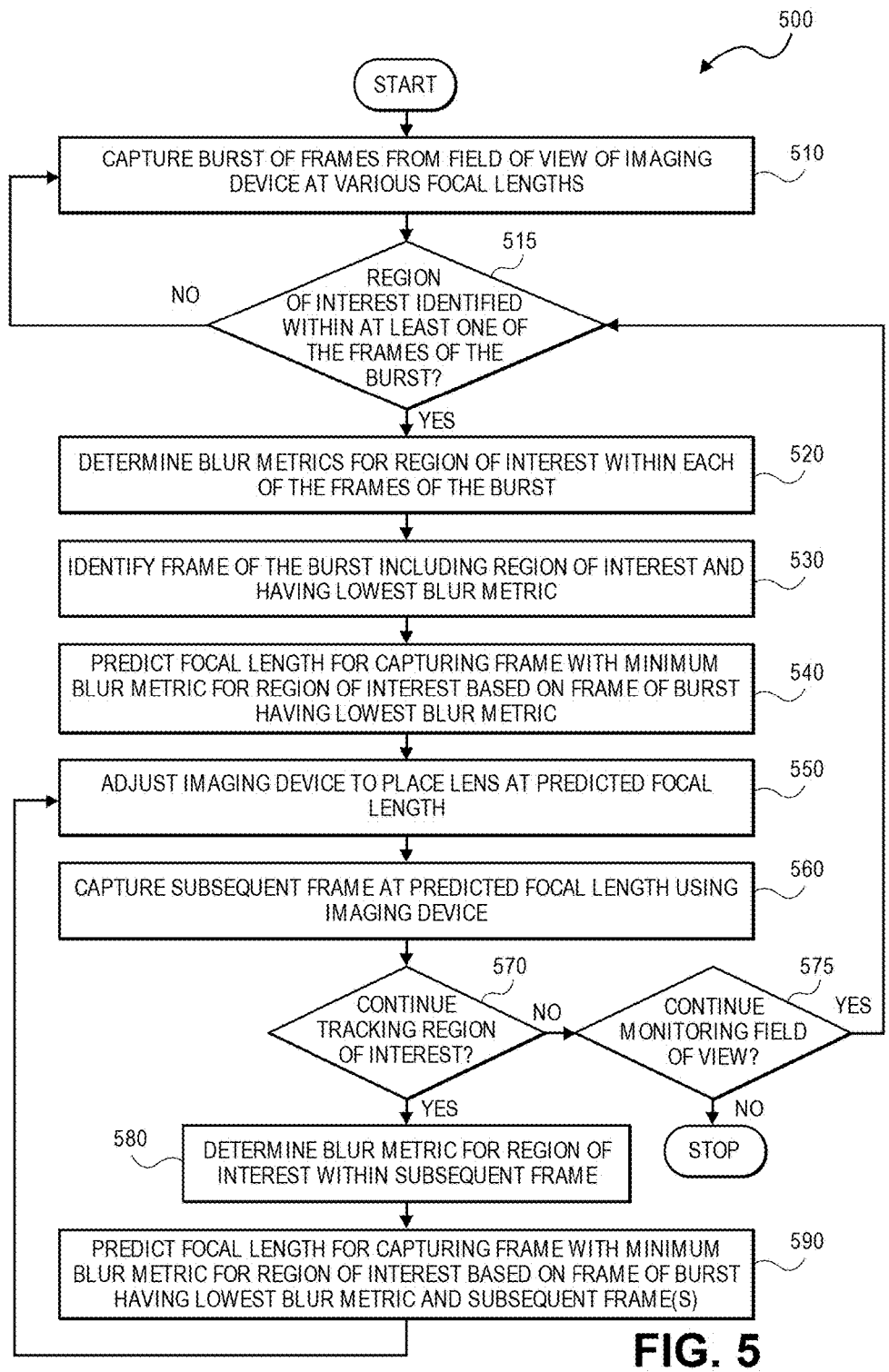
FIG. 5 is a flow chart of one process for focus specification or focus stabilization in accordance with embodiments of the present disclosure.

One embodiment of the present disclosure that utilizes a burst of images or frames captured at different focal lengths to predict a focal length for capturing a subsequent image or frame is shown in FIG. 5. Referring to FIG. 5, a flow chart 500 representing one embodiment of a process for focus specification and focus stabilization in accordance with embodiments of the present disclosure is shown.

At box 510, a burst of frames is captured from a field of view of an imaging device at various focal lengths. For example, the imaging device may be fixed in position or mobile, and may be a discrete device (e.g., an independent digital camera, depth sensor, range camera, infrared camera or radiographic camera) or incorporated into another system or component (e.g., a smartphone, an autonomous mobile robot, or an unmanned aerial vehicle). The bursts may be captured at various intervals of time, which may be defined by a shutter speed, a time required to adjust a lens, or on any other basis. In some embodiments, each of the frames of the burst has a relatively low level of resolution.

At box 515, whether a region of interest is identified within at least one of the images of the burst is determined. For example, the region of interest may be identified manually (e.g., based on one or more instructions or commands from a user, such as by contacting a touchscreen, repositioning an adjustable component, selecting a portion of a user interface or entering instructions using an alphanumeric keyboard or other feature) or automatically (e.g., according to one or more automated algorithms or techniques that utilize feature, edge or object detection principles). If a region of interest is not identified within at least one of the images of the burst, then the process returns to box 510, where another burst of frames is captured from a field of view of the imaging device, at various focal lengths.

If a region of interest is identified within at least one of the images of the burst, however, then the process advances to box 520, where blur metrics may be determined for the region of interest within each of the frames of the burst. The blur metrics for the images or frames that include the region of interest may be calculated on any basis. For example, a blur metric may be any measure, value, calculation or estimate indicative of the extent to which an image pixel is blurry or sharp, and may be determined based on any relevant information or data regarding the image pixel or one or more other image pixels surrounding the image pixel. In some embodiments, a blur metric may be determined based on an output of a Laplacian operator, a Tenengrad operator, or any like algorithm or machine-learning tool. Such information or data may include values of the red, blue, green or grayscale components of such image pixels, as well as any hues (e.g., a relative color shade), saturations (e.g., a relative intensity) or brightness (e.g., a relative lightness) of such image pixels, or any other relevant information or data. Alternatively, or additionally, a perceptual score representative of sharpness or clarity may be calculated for each of the frames.

At box 530, a frame of the burst that includes the region of interest and has the lowest blur metric is identified. Where a blur metric represents a level of blur of a frame as a whole, or of a region of interest in particular, the frame having the lowest blur metric of the frames is the least blurry or most sharp frame. Alternatively, or additionally, where a perceptual score is calculated for each of the frames, the frame having the highest perceptual score is the most sharp or least blurry frame.

At box 540, a focal length is predicted for capturing a frame with a minimum blur metric for the region of interest based on the frame of the burst having the lowest blur metric. The focal length may be predicted on any basis, including but not limited to an estimated size, shape, velocity or relevance of one or more items within the region of interest, other information or data regarding the content of the region of interest, or on any other intrinsic factor. In some embodiments, the focal length may be predicted based on blur metrics (or perceptual scores) calculated for other images or frames captured earlier or later in time than the capture of the burst of frames at box 510. At box 550, the imaging device is adjusted to place the lens at the predicted focal length with respect to an imaging sensor. In some embodiments, the lens may be manually adjusted. In other embodiments, the lens may be automatically adjusted.

At box 560, a subsequent frame is captured at the predicted focal length using the imaging device. The subsequent frame may be captured at a predetermined time associated with the predicted focal length, e.g., a time when one or more objects within the region of interest are expected to be within a depth of field defined at least in part by the predicted focal length. In some embodiments, the subsequent frame has a relatively high level of resolution, particularly compared to the levels of resolution of the frames of the burst captured at box 510.

At box 570, whether the tracking of the region of interest is to continue following the capture of the subsequent frame at box 560 is determined, e.g., whether the subsequent frame is the final image or frame desired from the field of view of the imaging device, or whether the imaging device is programmed or configured to track the region of interest within imaging data such as video files and various audio signals or other metadata for extended durations. If the continued tracking of the region of interest is no longer desired, then the process advances to box 575, where whether the continued monitoring of the field of view of the imaging device is desired may be determined. If the monitoring of the field of view, e.g., for other regions of interest, is desired, then the process returns to box 510, where a burst of frames is captured from the field of view of the imaging device at various focal lengths, and to box 515, where whether another region of interest is identified within at least one of the images of the burst is determined. If the monitoring of the field of view is no longer desired, then the process ends.

If the continued tracking of the region of interest is desired, however, then the process advances to box 580, where a blur metric is determined for the region of interest within the subsequent frame. The blur metric for the region of interest may be calculated according to the same algorithms or techniques that were used to determine the blur metrics for the region of interest for each of the frames of the burst, at box 520. At box 590, a focal length is predicted for capturing a frame with a minimum blur metric for the region of interest based on the subsequent frame and/or the frames of the burst having the lowest blur metric and any other subsequent frames. The process then returns to box 550, where the imaging device is adjusted to place the lens at the focal length predicted at box 590, and to box 560, where another subsequent frame is captured at the predicted focal length using the imaging device.

Figure 6A:
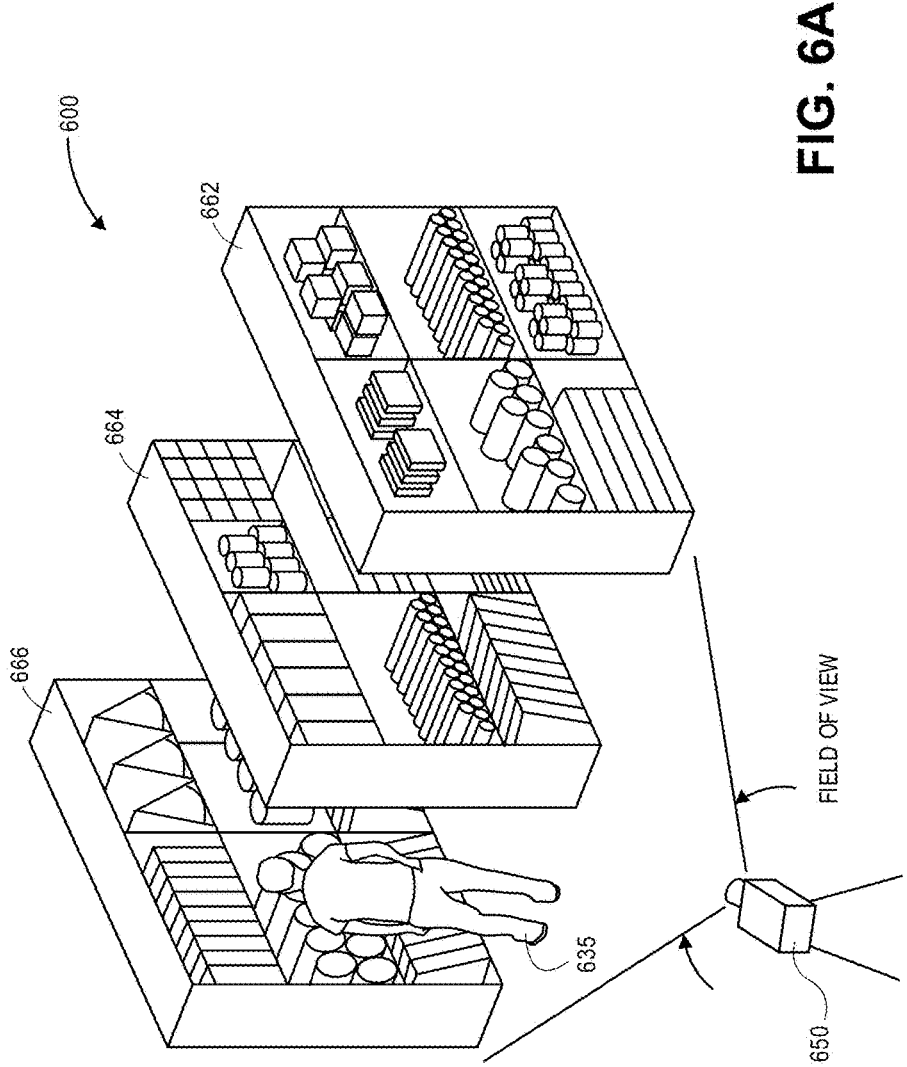
FIGS. 6A through 6E are views of aspects of one process for focus specification or focus stabilization in accordance with embodiments of the present disclosure.

By capturing a burst or other series or plurality of images or frames at different focal lengths, and evaluating such images to determine whether the images or frames include a region of interest and to identify focal lengths for capturing images or frames at higher levels of resolution, sharpness or clarity, the systems and methods of the present disclosure enable an imaging device to intelligently evaluate objects, humans or other things within an environment, and to monitor activities that may be occurring within the environment. Referring to FIGS. 6A through 6E, a system 600 is shown. As is shown in FIG. 6A, the system 600 includes a worker 635, an imaging device 650 and a plurality of shelving units 662, 664, 666. The worker 635 and the shelving units 662, 664, 666 are within a field of view of the imaging device 650.

Figure 6B:
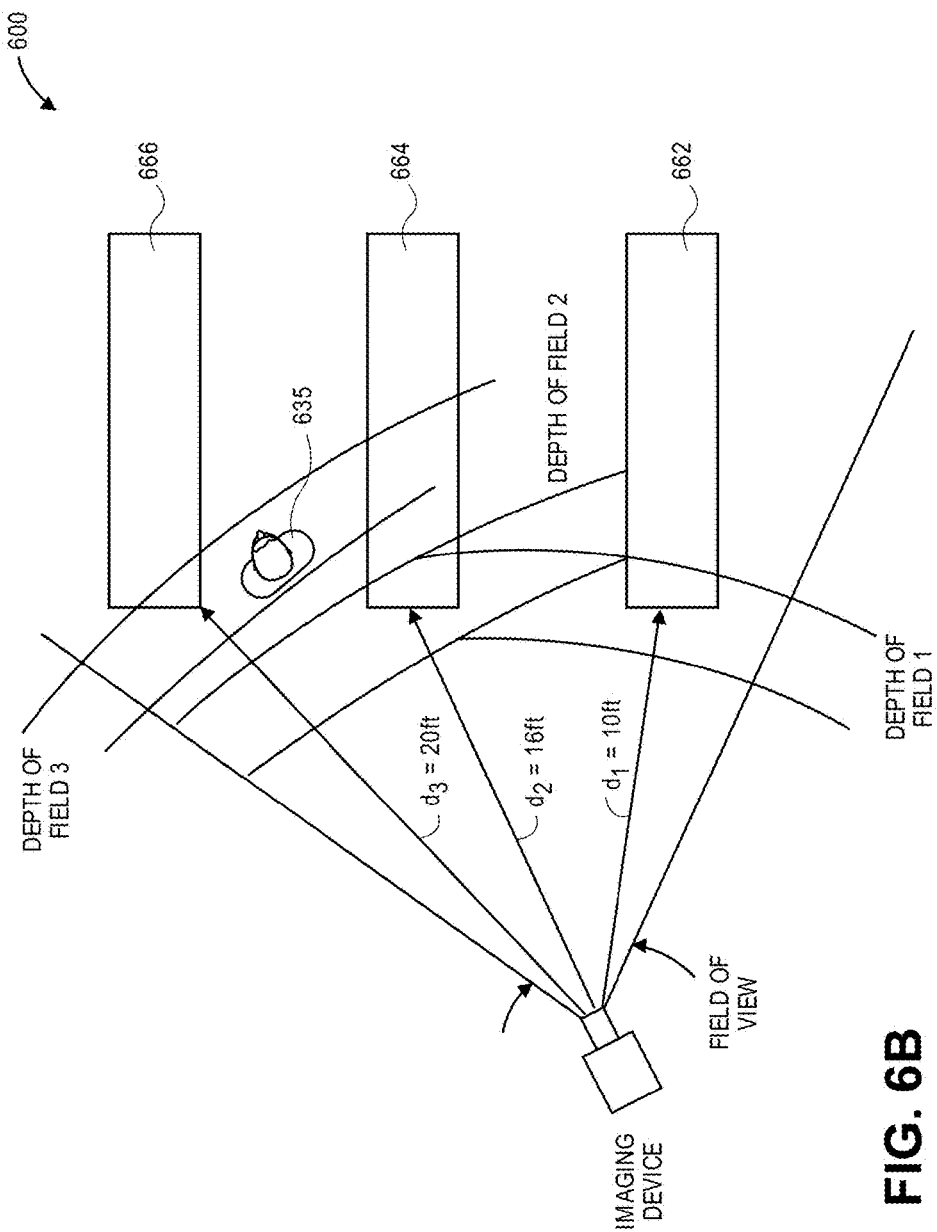

As is shown in FIG. 6B, the shelving units 662, 664, 666 are located at distances $d_1$, $d_2$, $d_3$ from the imaging device 650. Thus, the imaging device 650 may be used to capture images or frames at various focal lengths within its field of view, and may monitor or evaluate a number of objects, humans or other things within the field of view. For example, as is shown in FIG. 6B, the distance $d_1$ of the shelving units 662 from the imaging device 650 is approximately ten feet, while the distances $d_2$, $d_3$ of the shelving units 664, 666 from the imaging device 650 are approximately sixteen feet and twenty feet, respectively. Therefore, depending on a focal length of the imaging device 650, which in turn defines a depth of field at least in part, portions of the contents of the field of view (e.g., portions of one or more of the shelving units 662, 664, 666) may be rendered clearly within imaging data captured using the imaging device 650, in different depths of field.

Figure 6C:
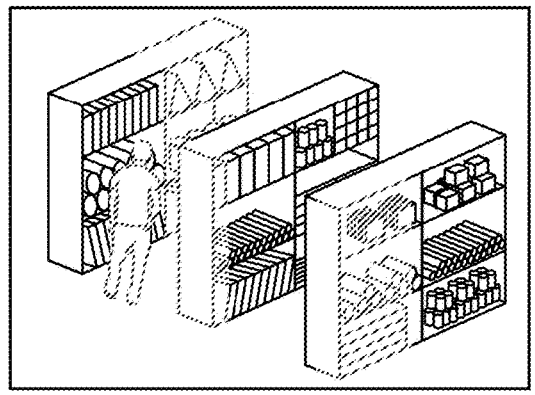
Figure 6D:
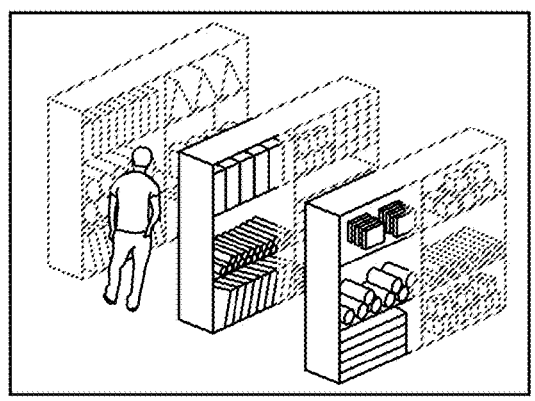
Figure 6E:
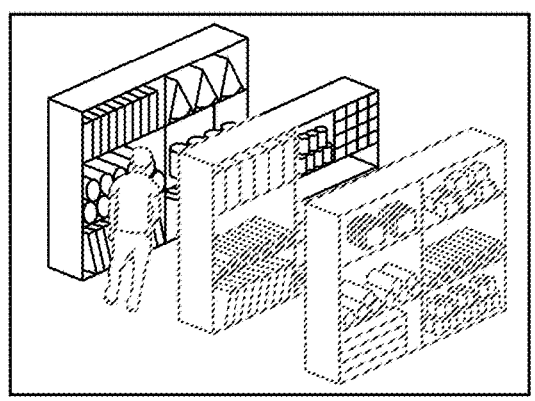

For example, referring to FIG. 6C, an image captured from the field of view of the imaging device 650 with a focal length of one hundred twenty millimeters (120 mm) is shown. The image of FIG. 6C depicts the shelving unit 664 and portions of the shelving unit 662 sharply or with limited blur, and also shows the shelving unit 666 and other portions of the shelving unit 662 in a blurry or less sharp manner. Referring to FIG. 6D, an image captured from the field of view of the imaging device 650 with a focal length of one hundred millimeters (100 mm) is shown. The image of FIG. 6D depicts the shelving unit 662 sharply or with limited blur, and also shows the shelving units 664, 666 in a blurry or less sharp manner. Referring to FIG. 6E, an image captured from the field of view of the imaging device 650 with a focal length of one hundred fifty millimeters (150 mm) is shown. The image of FIG. 6E depicts the shelving unit 666 and portions of the shelving unit 664 sharply or with limited blur, and also shows the shelving unit 662 and other portions of the shelving unit 664 in a blurry or less sharp manner.

Thus, as is shown in FIGS. 6A through 6E, an entire field of view of an imaging device may be monitored for objects, humans or other things, or evaluated to detect motion or movements of such objects, humans or things, by varying the focal lengths of the imaging device and capturing and evaluating imaging data at the various focal lengths. Where one or more images or frames are captured using the imaging device, each of the images or frames may be evaluated in order to recognize any specific objects or attributes thereof (e.g., sizes, shapes, colors, velocities, levels of reflectance), or actions undertaken by or involving such objects, with regard to any predetermined extrinsic criteria such as time, location or relevance. For example, referring to the image shown in FIG. 6C, the contents or condition of the shelving unit 664 (e.g., items deposited thereon) may be determined and compared to one or more records in order to determine whether such contents are consistent with inventory records, or whether such condition is satisfactory. Likewise, referring to the image shown in FIG. 6E, the contents or condition of the shelving unit 666 may be similarly determined and compared to one or more of such records. Referring to the image shown in FIG. 6D, the worker therein may be identified based on one or more attributes of the image (e.g., a bar code or other identifier expressed on a badge borne by the worker, or a face of the worker), and the activities of the worker relating to the shelving unit 666 may also be monitored for compliance, inventory tracking or security purposes, or for any other purpose.

In this regard, one or more of the images shown in FIGS. 6C through 6E may be utilized to identify a region of interest, either manually or automatically. For example, where one or more of the images is displayed in a user interface on a display of a computer system, a user of the computer system may designate one or more regions within one or more of the images as a region of interest, and thereby instruct the computer system to maintain the regions appropriately in focus, and monitor one or more actions occurring therein. Alternatively, or additionally, the images may be automatically evaluated in order to determine whether such images include any abstract items, or depict motion or movements of interest. For example, in some embodiments, an abstract item may be automatically recognized within the image frame, e.g., in accordance with one or more feature, edge or object detection algorithms or techniques, or an event may be recognized within the image frame, and the region of interest may be defined based on the abstract item or the event.

Furthermore, where two or more regions of interest are identified, the regions may be monitored and evaluated on any basis, including but not limited to an alternating or random order, or based on a level of priority that may be defined according to locations or objects within the regions of interest, or attributes of the locations or objects, as well as any actions that may be occurring therein, or other extrinsic factors, including but not limited to times at which such objects are present or such actions are occurring, or any statistical data regarding the observed objects or actions. Thus, referring again to the images of FIGS. 6C through 6E, an imaging device may be configured to captures images or frames which clearly depict either the shelving unit 662 (e.g., the image of FIG. 6D), the shelving unit 664 (e.g., the image of FIG. 6C) or the shelving unit 666 (e.g., the image of FIG. 6E) at regular intervals or in accordance with schedules defined based on the levels of priority.

Figure 7B:
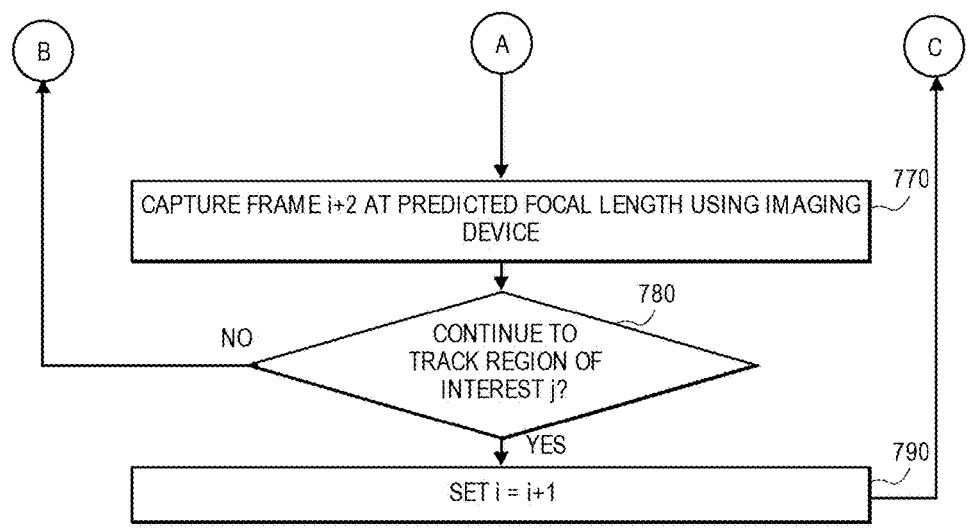

As is also discussed above, the monitoring of regions of interest may be iterative in nature, and blur metrics or other measures regarding such regions may be continuously calculated in order to identify focal lengths for clearly capturing the contents of such regions with limited levels of blur or enhanced sharpness. Referring to FIGS. 7A and 7B, a flow chart 700 representing one embodiment of a process for focus specification and focus stabilization in accordance with embodiments of the present disclosure is shown.

At box 710, a value of a step variable i for capturing frames at focal lengths is set to one, and at box 712, a frame i is captured at focal length i using an imaging device. The frame i may be an initial frame captured by the imaging device, or may be a frame captured following an earlier capture of a frame or a burst or series of frames. Additionally, the frame i may be captured as a part of a burst or series of frames. Furthermore, the focal length i may be a common focal length at which each of a burst or series of frames, including the frame i, is captured. Alternatively, the focal length i may be one of a variety of focal lengths at which the frames of the burst or series are captured.

At box 714, whether one or more regions of interest is recognized within frame i is determined. For example, the regions of interest may be identified manually, e.g., by a manual interaction with user interface or input/output device, or automatically through one or more probabilistic analyses of images or frames of imaging data as the imaging data is captured by the imaging devices. Moreover, an evaluation of the contents of frame i for the purpose of determining whether frame i includes the one or more regions of interest may occur in any order, which may be determined on any basis. If one or more regions of interest are not recognized within frame i, then the process returns to box 712, where a different frame i is captured at focal length i, using the imaging device. For example, the return to box 712 may result in the capture of another frame at the same focal length, or at a different focal length. Further, the frame may be evaluated in its entirety, or evaluated only with respect to one or more discrete sections or areas, in order to determine whether regions of interest are recognized therein.

If one or more regions of interest are recognized within the frame i, then the process advances to box 716, where a priority ranking is defined for the n regions of interest recognized therein. For example, if only a single region of interest is recognized within the frame i, then the priority ranking shall consist of the single region of interest. If two or more regions of interest are recognized within the frame i, the priority ranking may be defined on any basis, e.g., based on sizes, velocities, levels of relevance or attributes of objects within the recognized regions of interest, based on a spatial, temporal or statistical criteria, or based on any other intrinsic or extrinsic factor regarding the respective regions of interest. At box 718, a value of a step variable j corresponding to the regions of interest is set to one.

At box 720, a blur metric i is determined for the region of interest j within the frame i. The blur metric i may correspond to a plurality of pixels within the region of interest j, and may be indicative of a level of blur or sharpness of the portion of the frame i therein. Additionally, the blur metric i may be calculated or otherwise determined in any manner, e.g., based on a weighted sum of a variance of a Laplacian operator output, a sum of modified Laplacians, an output of a Tenengrad operator, or an output of a modified Tenengrad operator. At box 725, a focal length i+1 is predicted for the region of interest j based on the blur metric i determined at box 720. The focal length i+1 may be predicted based exclusively on the value of the blur metric i or, alternatively, based on the value of the blur metric i in conjunction with one or more attributes of the region of interest j, or any other intrinsic or extrinsic factor. For example, the frame i may have been captured at the focal length i as a part of a burst or series of frames, and the focal length i+1 may be the same as the focal length i, or a different focal length, e.g., a focal length selected at random, in accordance with a predetermined schedule or scheme, or on any other basis.

At box 730, a frame i+1 is captured at the focal length i+1 predicted at box 725 using the imaging device. The frame i+1 may be captured immediately in succession following the frame i, or may be captured after one or more other frames have been captured. Moreover, the frame i+1 may be captured at the same level of resolution as the frame i captured at box 712, or at a different level of resolution (e.g., a higher level of resolution). At box 740, whether the region of interest j is identified within frame i+1 captured at focal length i+1 at box 730 is determined. If the region of interest j is not identified within the frame i+1, then the process advances to box 742, where it is determined whether the value of the step variable j equals the number n of regions of interest recognized within frame i, viz., whether j=n, thereby implying that each of the n regions of interest recognized within the frame i has been evaluated and that images having minimum levels of blur or maximum levels of sharpness have been captured for each of the n regions. If the value of the step variable j equals the number n of regions of interest recognized within frame i, then the process ends. If the value of the step variable j does not equal the number n of regions of interest recognized within frame i, then the process advances to box 744, where the value of the step variable j is set at j+1, e.g., where the value of the step variable j is incrementally advanced by one, before returning to box 720.

If the region of interest j is identified within the frame i+1 captured at box 730, however, then the process advances to box 750, where a blur metric i+1 is determined for the region of interest j within the frame i+1. The blur metric i+1 may be calculated according to the same algorithms or techniques as the blur metric i at box 720. Additionally, in some embodiments, the frame i and the frame i+1 may be captured independently or, alternatively, either the frame i or the frame i+1, or both the frame i and the frame i+1, may be captured as part of a common burst or series along with one or more other frames.

At box 755, a focal length i+2 for capturing a frame i+2 with a minimum blur metric for the region of interest j is predicted based on the blur metric i and the blur metric i+1. For example, the difference in the blur metrics i, i+1 may indicate that the region of interest j, or one or more objects, humans or other things therein, may appear more blurry or less blurry over time, and a focal length i+2 that would capture the region of interest j with the lowest practicable blur within the frame i+2 may be derived based on such blur metrics i, i+1.

At box 760, the imaging device is adjusted to place a lens at the predicted focal length i+2, e.g., with respect to an imaging sensor, by manual or automatic means. At box 770, a frame i+2 is captured at the focal length i+2 predicted at box 750 using the imaging device, e.g., as a single frame, or as a one of a burst or series of frames. At box 780, whether the continued monitoring of the region of interest j is desired may be determined. If the monitoring of the region of interest is no longer desired, then the process advances to box 742, where whether the value of the step variable j is equal to n is determined. If the monitoring of the region of interest is desired, however, then the process advances to box 790, where the value of the step variable i is set at i+1, e.g., where the value of the step variable i is incrementally advanced by one, and to box 740, where it is determined whether the region of interest j is identified within the frame i+1, viz., the frame most recently captured at box 770.

Accordingly, the systems and methods of the present disclosure may be utilized to capture images or frames at various focal lengths, identify one or more regions of interest therein (e.g., on a manual or automatic basis), and determine blur metrics, perceptual scores, or other measures regarding the blur or sharpness of such frames. Subsequently, based on the focal lengths and/or blur metrics, perceptual scores or other measures, one or more focal lengths for clearly capturing imaging data regarding the regions of interest may be identified, the imaging device may be adjusted in a manner consistent with such focal lengths, and such imaging data may be so captured. Additionally, the imaging data captured at such focal lengths may be further refined in order to identify focal lengths for capturing other imaging data regarding the regions of interest, and the imaging device may be readjusted to capture imaging data at such focal lengths.

Figure 8A:
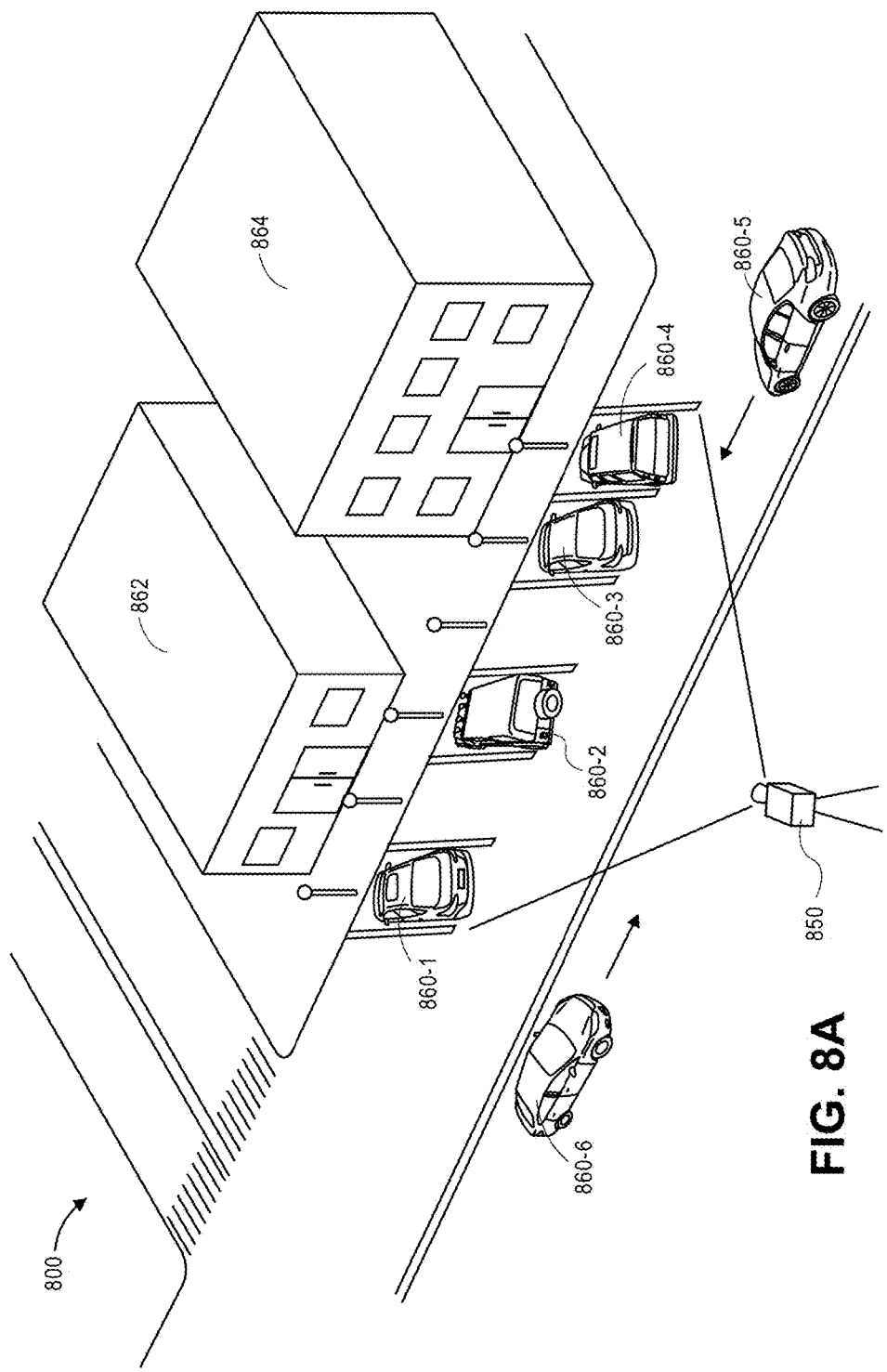
FIGS. 8A through 8D are views of aspects of one process for focus specification or focus stabilization in accordance with embodiments of the present disclosure.

By capturing imaging data at a variety of focal lengths, and identifying one or more regions of interest therein, and evaluating the imaging data to predict focal lengths for capturing imaging data regarding such regions of interest with limited blur in the future, the systems and methods of the present disclosure may be utilized to perform a number of broad applications for monitoring objects, humans or other things within a field of view of an imaging device, or evaluating one or more events or activities occurring therein. As is discussed above, the regions of interest may be identified on any basis. Referring to FIG. 8A, a scene 800 is shown. The scene 800 includes an imaging device 850, a plurality of vehicles 860-1, 860-2, 860-3, 860-4, 860-5, 860-6, and structures 862, 864 provided about an intersection. The imaging device 850 is configured to capture imaging data from a broad field of view that encompasses portions of such vehicles 860-1, 860-2, 860-3, 860-4, 860-5, 860-6 and structures 862, 864 about the intersection.

Regions of interest within imaging data may be identified by any manual or automatic means in accordance with the present disclosure. Referring to FIG. 8B, a laptop computer 822 displaying an image and a region of interest therein is shown. As is shown in FIG. 8B, a region of interest including the vehicle 860-2 may be automatically identified using one or more feature, edge or object detection principles, which may be configured to recognize an item in the abstract (e.g., any vehicle), or particular items (e.g., a specific model or type of vehicle, or a vehicle bearing a predefined license plate or other marked identifier), and to define a region of interest based on the recognized item or items. Additionally, as is also shown in FIG. 8B, further information regarding a region of interest (e.g., a make, a model, a license plate number) may also be presented on at least one computer display.

Thereafter, the systems and methods of the present disclosure may be configured to continuously monitor the region of interest defined by the vehicle 860-2 over time, e.g., by capturing imaging data including the region of interest using an imaging device, determining one or more blur metrics, perceptual scores or other measures for the region of interest or the imaging data as a whole, predicting one or more focal lengths, adjusting the imaging device in a manner consistent with such focal lengths, and capturing imaging data regarding the region of interest again. The imaging data may be captured regardless of whether the vehicle 860-2 remains in the position shown in FIG. 8B, or moves to another location within the field of view of the imaging device 850.

Figure 8C:
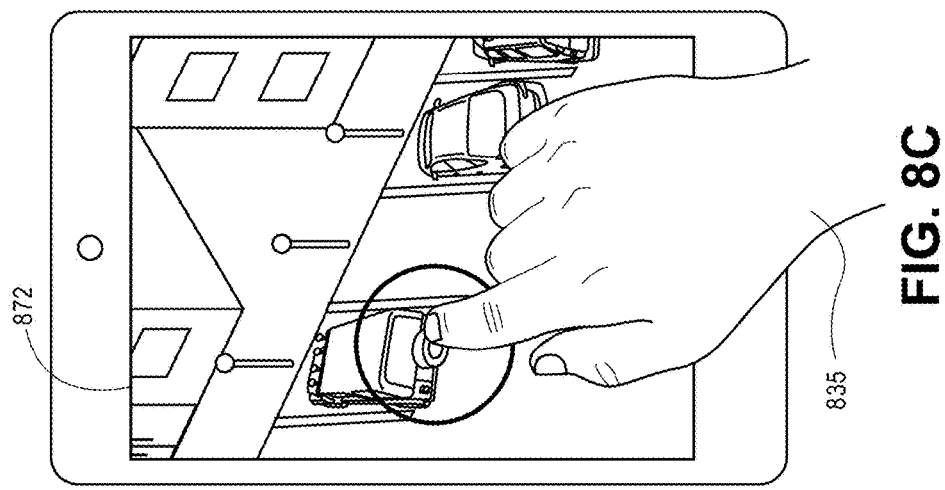
Figure 8B:
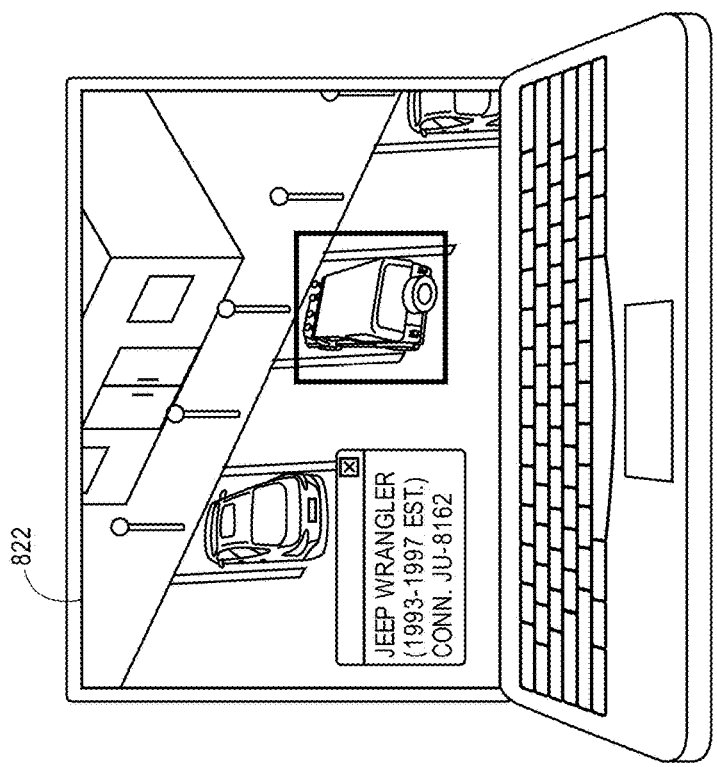

Referring to FIG. 8C, a mobile device 872 displaying an image and a region of interest therein is shown. As is shown in FIG. 8C, the region of interest may be manually identified by an interaction of a user 835 with a touchscreen of the mobile device 872, or in any other manner. The region of interest may thus be defined based on a predetermined number of image pixels surrounding the point of contact with the touchscreen. Although the region of interest in FIG. 8C is shown as having a substantially circular shape, such regions may take any form with respect to the point of contact, e.g., a square, rectangular, triangular, elliptical or other shape. Alternatively, the user 835 may define a shape or form of a region of interest with one or more gestures, e.g., by dragging his or her finger along the touchscreen in a continuous line or in one or more segments. Any type or form of interaction by the user 835 may be used to manually define a region of interest within an image in accordance with the present disclosure.

Figure 8D:
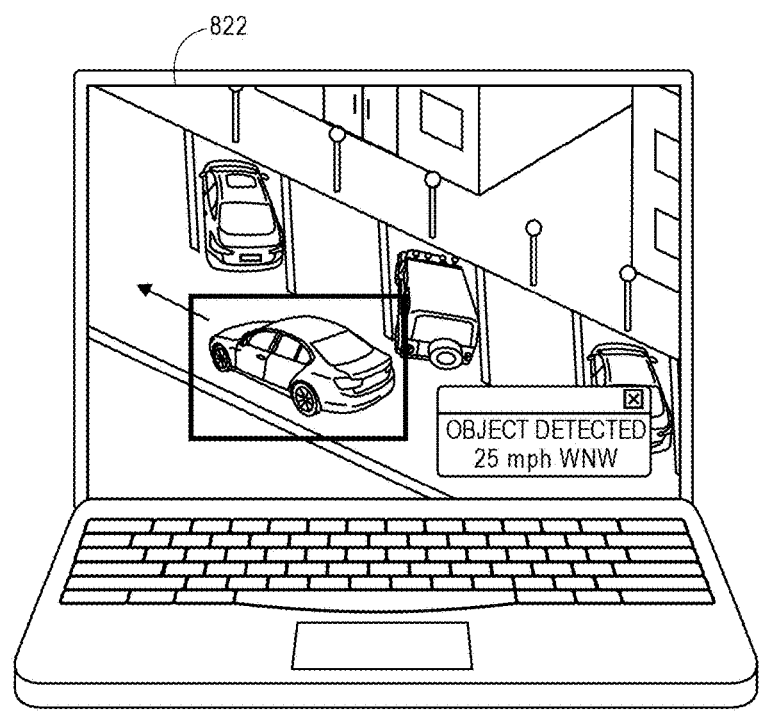

Referring to FIG. 8D, the laptop 822 displaying another image and a region of interest therein is shown. As is shown in FIG. 8D, the region of interest may be defined based on motion of semantic objects expressed therein, or changes in the levels of blur or contents of image pixels based on such motion. For example, as is shown in 8D, the vehicle 860-5 is shown as passing behind the vehicles 860-1, 860-2. Additionally, as is also shown in FIG. 8D, further information regarding a region of interest (e.g., a course and/or a speed of the vehicle 860-5) may also be presented on at least one computer display.

As is discussed above, the systems and methods of the present disclosure may be particularly useful in fulfillment center operations, where items having a variety of sizes, shapes or other attributes may be expected to appear within a field of view of the imaging device, e.g., upon arriving at the fulfillment center on cars, trucks, trailers, freight cars, container ships or cargo aircraft, or while transiting on a conveying system (e.g., a conveyor belt). Images or frames of the arriving items may be captured and automatically focused in order to render identifiers of such items (e.g., alphanumeric characters, symbols, or marked identifiers such as one-dimensional or two-dimensional bar codes) as clearly as possible, thereby enabling the items to be identified from such images or frames.

Figure 9A:
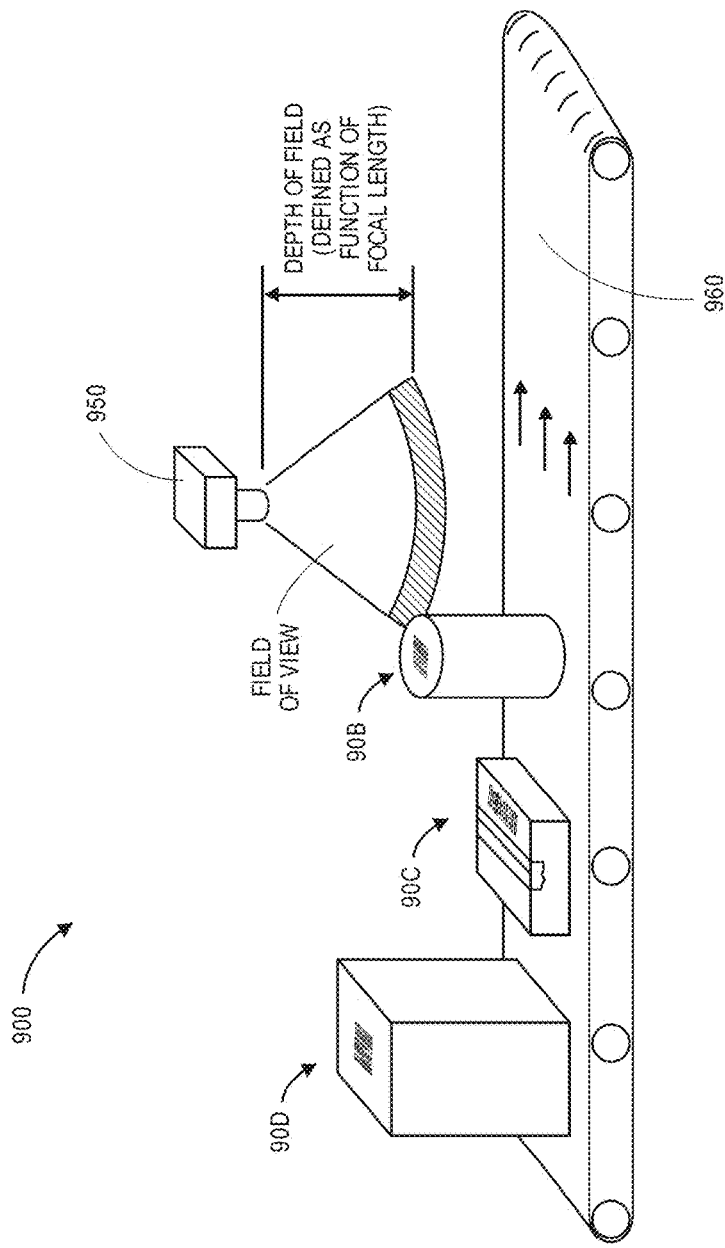
FIGS. 9A through 9D are views of aspects of one process for focus specification or focus stabilization in accordance with embodiments of the present disclosure.

Referring to FIG. 9A, a scene 900 including an imaging device 950 and a conveying system 960 is shown. The conveying system 960 includes a plurality of items 90B, 90C, 90D provided thereon. As is shown in FIG. 9A, the items 90B, 90C, 90D are transiting along the conveying system 960 in series, and in a manner that will cause the items 90B, 90C, 90D to enter within a field of view of the imaging device 950. A depth of field of the imaging device 950 is defined as a function of a focal length of the imaging device 950. The item 90B is a right cylindrical container. The item 90C is a substantially flat box. The item 90D is a comparatively taller box. Thus, as is shown in FIG. 9A, surfaces of the items 90B, 90C, 90D pass within the field of view of the imaging device 950 at different heights with respect to the conveying system 960.

Figure 9B:
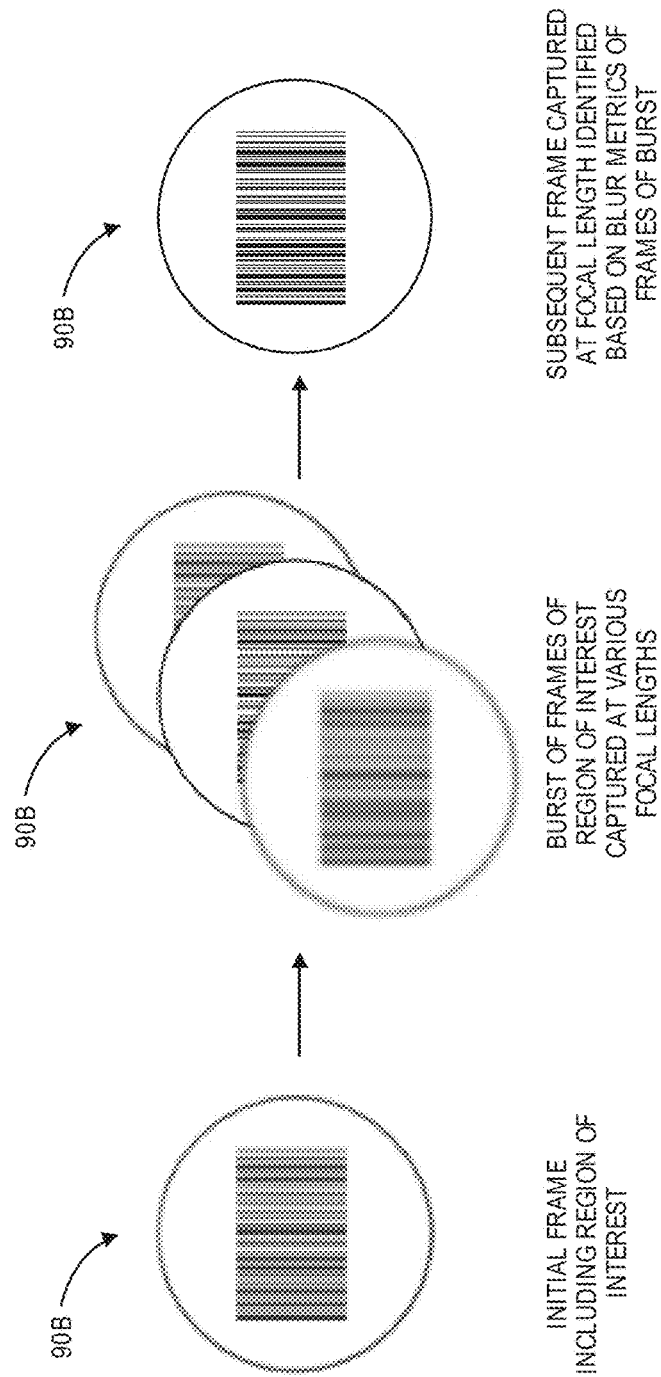
Figure 9C:
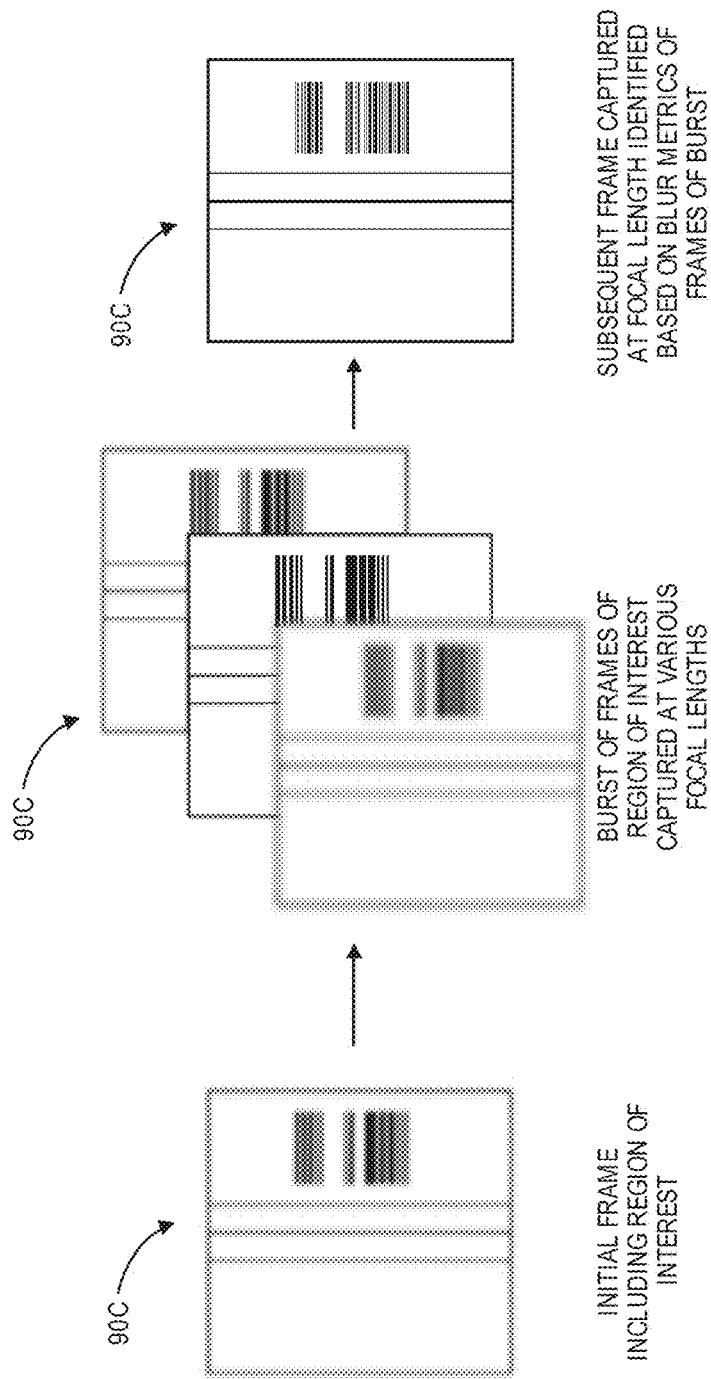
Figure 9D:
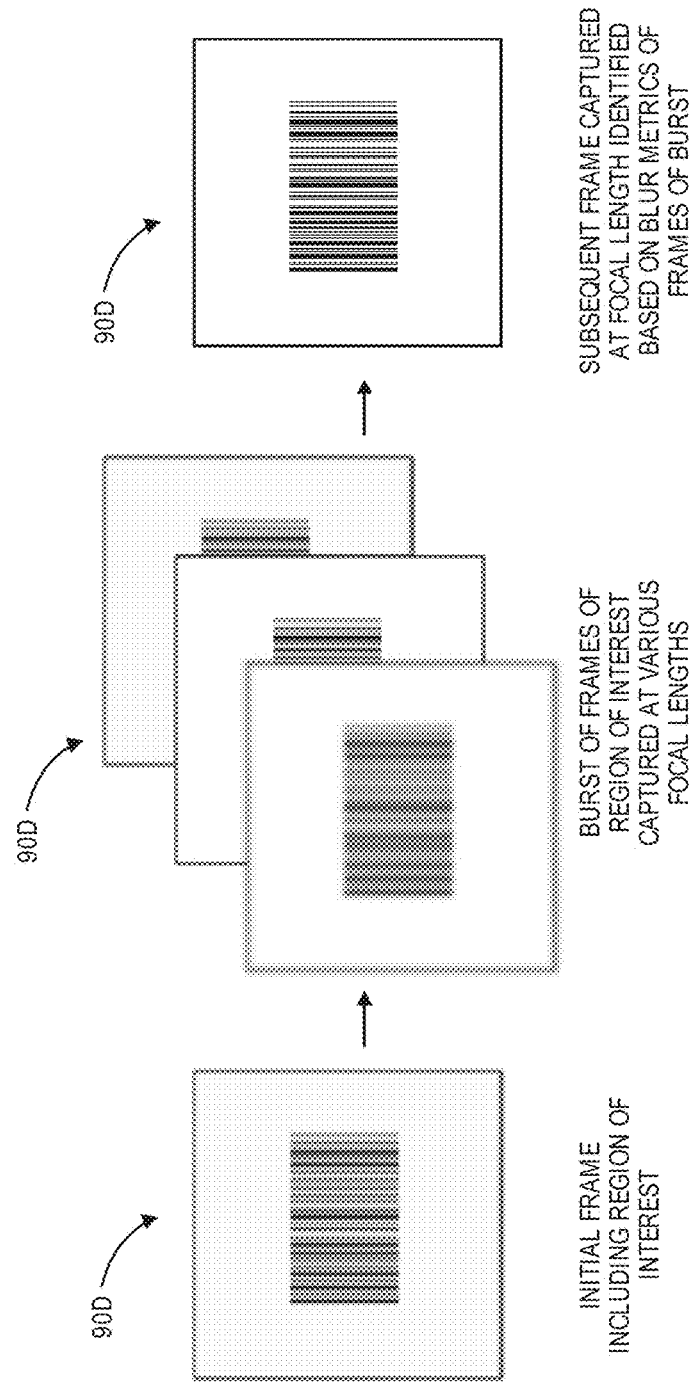

As is discussed above, the systems and methods of the present disclosure may be utilized to capture bursts of images of an item using an imaging device. Upon recognizing a region of interest within one or more of the images of the burst, e.g., an area of an image having a plurality of pixels corresponding to text, symbols or numbers provided on one or more surfaces of the item, the imaging device may be configured to determine a level of blur or sharpness of the region of interest within one or more of the images, predict focal lengths for capturing the region of interest with sufficient clarity in subsequently captured images, adjust the imaging device accordingly, and capture subsequent images at the predicted focal lengths. Referring to FIG. 9B, an initial frame captured from an upper surface of the item 90B is shown. After a blur metric is calculated based on the initial frame, a burst of frames of the upper surface of the item 90B are captured at various focal lengths, and each of the frames of the burst is shown having varying degrees of blur or sharpness. Based on the attributes of one or more of the frames of the burst (e.g., blur metrics calculated based on the frames, or any other information or data regarding the frames or a context in which the frames were captured), a focal length for capturing a subsequent frame from the item 90B at a minimum level of blur (or a maximum level of sharpness) may be predicted, and a subsequent frame may be captured at the predicted focal length. Similarly, referring to FIGS. 9C and 9D, initial frames may be captured from the upper surfaces of the items 90C, 90D, and focal lengths for capturing subsequent frames from the items 90C, 90D at minimum levels of blur (or maximum levels of sharpness) may be determined.

Thus, some embodiments of the present disclosure may be utilized to identify items of varying sizes or shapes based on one or more identifiers provided thereon (e.g., alphanumeric characters, symbols, or marked identifiers such as one-dimensional or two-dimensional bar codes) using one or more imaging devices. Such imaging devices may be configured to capture images or bursts of images at regular intervals and, upon recognizing an item, or an identifier provided on a surface of the item, define a region of interest including pixels corresponding to the item, or to the identifier provided on the surface of the item, and automatically configure themselves to maintain the regions of interest in focus in subsequently captured images. Where an imaging device is capable of capturing tens of frames per second (e.g., 30 to 60 frames per second), a region of interest may be recognized and placed into focus based on its content in a remarkably short period of time, and items may be uniquely identified thereby.

Those of ordinary skill in the pertinent arts will recognize that the systems and methods disclosed herein may be utilized in connection with any number of applications. For example, the focal lengths, blur metrics, perceptual scores or other measures that are determined in accordance with the present disclosure may be used to focus imaging devices that are configured to capture not only moving images (e.g., multiple frames in series) but also still images (e.g., single, discrete frames). For example, by capturing a low-resolution image, or a burst of low-resolution images, prior to capturing high-resolution imaging data (e.g., video files), a focal length for capturing the high-resolution imaging data may be determined based on blur metrics and/or focal lengths of one or more of the low-resolution images of the burst. In this regard, the high-resolution imaging data subsequently captured may have a higher image quality as a result. Moreover, the high-resolution imaging data subsequently captured may also be evaluated to determine one or more blur metrics of images or frames, and focal lengths for capturing further imaging data may also be determined.

Although some of the embodiments disclosed herein reference the calculation of "blur metrics" or "perceptual scores," those of ordinary skill in the pertinent art will recognize that the systems and methods disclosed herein are not so limited. For example, the systems and methods of the present disclosure may operate by determining levels of blur or sharpness in any manner, and determining focal lengths based on such levels. References to the utility of "blur metrics" or "perceptual scores" herein may also be deemed to refer to other measures for determining levels of blur or clarity within one or more images of frames accordingly.

Furthermore, although some of the embodiments described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7A and 7B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An imaging device comprising:
    a lens;
    an imaging sensor having a photosensitive surface with a first plurality of pixel sensors;
    at least one memory device; and
    at least one computer processor, wherein the at least one computer processor is configured to at least:
    capture a first image, wherein the first image is captured with the lens at a first focal length from the imaging sensor, and wherein the first image is captured at a first level of resolution;
    recognize at least a first object and a second object within the first image;
    automatically define a first region of interest within the first image based at least in part on the first object within the first image;
    automatically define a second region of interest within the first image based at least in part on the second object within the first image;
    determine a first blur metric associated with the first region of interest within the first image;
    determine a second blur metric associated with the second region of interest within the first image;
    adjust the lens to a second focal length from the imaging sensor;
    capture at least a second image, wherein the second image is captured with the lens at the second focal length from the imaging sensor, and wherein the second image is captured at a second level of resolution;
    recognize at least the first object and the second object within the second image;
    automatically identify the first region of interest within the second image based at least in part on the first object within the second image;
    automatically identify the second region of interest within the second image based at least in part on the second object within the second image;
    determine a third blur metric associated with the first region of interest within the second image;
    determine a fourth blur metric associated with the second region of interest within the second image;
    determine a third focal length for capturing a third image based at least in part on at least one of the first focal length, the first blur metric, the second focal length or the third blur metric;
    determine a fourth focal length for capturing a fourth image based at least in part on at least one of the first focal length, the first blur metric, the second focal length or the fourth blur metric;
    adjust the lens to the third focal length from the imaging sensor;
    capture the third image, wherein the third image is captured with the lens at the third focal length from the imaging sensor, wherein the third image is captured at a third level of resolution, and wherein the third level of resolution exceeds at least one of the first level of resolution or the second level of resolution;
    adjust the lens to the fourth focal length from the imaging sensor; and
    capture the fourth image, wherein the fourth image is captured with the lens at the fourth focal length from the imaging sensor, wherein the fourth image is captured at a fourth level of resolution, and wherein the fourth level of resolution exceeds at least one of the first level of resolution or the second level of resolution.

2. The imaging device of claim 1, wherein the at least one computer processor is further configured to at least:
    compare the third blur metric to the fourth blur metric; and
    determine that the third blur metric is greater than the fourth blur metric,
    wherein the lens is adjusted to the third focal length from the imaging sensor and the third image is captured in response to determining that the third blur metric is greater than the fourth blur metric.

3. The imaging device of claim 1, wherein the at least one computer processor is further configured to at least:
    automatically identify the first region of interest within the third image;
    determine a fifth blur metric associated with the first region of interest within the third image;
    determine a fifth focal length for capturing a fifth image based at least in part on at least one of the third focal length or the fifth blur metric;
    adjust the lens to the fifth focal length from the imaging sensor; and
    capture the fifth image, wherein the fifth image is captured with the lens at the fifth focal length from the imaging sensor.

4. The imaging device of claim 1, wherein the at least one computer processor is further configured to at least:
    cause a display of the first image on a computer display having a touchscreen element;
    receive a selection of a portion of the touchscreen element; and automatically identify a portion of the first image associated with the selection of the portion of the touchscreen element,
wherein the first region of interest is identified within the first image based at least in part on the portion of the first image associated with the selection of the portion of the touchscreen element.

5. A computer-implemented method comprising:
identifying a first digital image captured using a first imaging device, wherein the first digital image is captured with a lens of the first imaging device at a first focal length with respect to an image sensor of the first imaging device;
selecting a first region of interest in at least a first portion of the first digital image;
determining a first blur metric for at least the first portion of the first digital image;
selecting a second region of interest in at least a second portion of the first digital image;
determining a second blur metric for at least the second portion of the first digital image;
predicting a second focal length for capturing a second digital image based at least in part on at least one of the first focal length or the first blur metric, wherein the second focal length is predicted to maintain the first region of interest in focus within the second digital image;
adjusting the lens to the second focal length with respect to the image sensor;
capturing the second digital image using the first imaging device;
predicting a third focal length for capturing a third digital image based at least in part on at least one of the first focal length or the second blur metric, wherein the second focal length is predicted to maintain the second region of interest in focus within the third digital image;
adjusting the lens to the third focal length with respect to the image sensor; and
capturing the third digital image using the first imaging device.

6. The computer-implemented method of claim 5, wherein identifying the first digital image captured using the first imaging device further comprises:
identifying a plurality of focal lengths, wherein the plurality of focal lengths includes the first focal length;
capturing a burst of digital images using the first imaging device, wherein each of the plurality of digital images is captured at a respective one of the plurality of focal lengths;
determining blur metrics for portions of at least a first plurality of the digital images of the burst; and
selecting one of the first plurality of the digital images of the burst, having a portion with a lowest blur metric,
wherein the first digital image is the selected one of the first plurality of the digital images of the burst,
wherein the first blur metric is the portion with the lowest blur metric, and
wherein the first blur metric is the lowest blur metric.

7. The computer-implemented method of claim 6, wherein identifying the plurality of focal lengths comprises at least one of:
selecting at least one of the plurality of focal lengths at random; or
selecting the at least one of the plurality of focal lengths based at least in part on historical data regarding at least one of the first imaging device or an environment in which the first imaging device is provided.

8. The computer-implemented method of claim 5, wherein selecting the first region of interest in at least the first portion of the first digital image further comprises:
identifying a first plurality of semantically related pixels within the first portion of the first digital image, wherein the first region of interest is selected based at least in part on the first plurality of semantically related pixels; and
identifying a second plurality of semantically related pixels within the second portion of the first digital image, wherein the second region of interest is selected based at least in part on the second plurality of semantically related pixels.

9. The computer-implemented method of claim 8, further comprising:
causing a display of at least the first portion and the second portion of the first digital image on a touchscreen display;
receiving information regarding a first interaction with at least a first portion of the touchscreen display, wherein the first portion of the touchscreen display is associated with at least one of the first plurality of semantically related pixels; and
receiving information regarding a second interaction with at least a second portion of the touchscreen display, wherein the second portion of the touchscreen display is associated with at least one of the second plurality of semantically related pixels,
wherein the first region of interest is selected based at least in part on the first interaction with the portion of the touchscreen display, and
wherein the second region of interest is selected based at least in part on the second interaction with the portion of the touchscreen display.

10. The computer-implemented method of claim 8, wherein identifying the first plurality of semantically related pixels within the first portion of the first digital image comprises:
determining that the first plurality of semantically related pixels is associated with at least one of a first predetermined shape, a first predetermined size, a first predetermined velocity, a first predetermined feature, a first predetermined color, a first predetermined marking, a first predetermined level of reflectance or a first predetermined frequency,
wherein selecting the first region of interest in at least the first portion of the first digital image comprises:
defining the first region of interest based at least in part on the first predetermined shape, the first predetermined size, the first predetermined velocity, the first predetermined feature, the first predetermined color, the first predetermined marking, the first predetermined level of reflectance or the first predetermined frequency,
wherein identifying the second plurality of semantically related pixels within the second portion of the first digital image comprises:
determining that the first plurality of semantically related pixels is associated with at least one of a second predetermined shape, a second predetermined size, a second predetermined velocity, a second predetermined feature, a second predetermined color, a second predetermined marking, a second predetermined level of reflectance or a second predetermined frequency, and
wherein selecting the second region of interest in at least the second portion of the first digital image comprises:

defining the first region of interest based at least in part on the second predetermined shape, the second predetermined size, the second predetermined velocity, the second predetermined feature, the second predetermined color, the second predetermined marking, the second predetermined level of reflectance or the second predetermined frequency.

11. The computer-implemented method of claim 5, further comprising:
automatically recognizing a first plurality of pixels corresponding to a first object within the first portion of the first digital image; and
automatically recognizing a second plurality of pixels corresponding to a second object within the second portion of the first digital image,
wherein the first region of interest is selected based at least in part on at least the first plurality of pixels, and
wherein the second region of interest is selected based at least in part on at least the second plurality of pixels.

12. The computer-implemented method of claim 11, further comprising:
automatically determining that the first plurality of pixels corresponds to motion of the first object within the first portion of the first digital image; and
automatically determining that the second plurality of pixels corresponds to motion of the second object within the second portion of the first digital image,
wherein the first region of interest is selected based at least in part on at least the motion of the first object, and
wherein the second region of interest is selected based at least in part on at least the motion of the second object.

13. The computer-implemented method of claim 12, wherein automatically determining that the first plurality of pixels corresponds to the motion of the first object within the first portion of the first digital image comprises:
providing at least the first portion of the first digital image as a first input to at least one classifier;
receiving a first output from the at least one classifier; and
determining that the first plurality of pixels corresponds to the motion of the first object based at least in part on the first output from the at least one classifier, and wherein automatically determining that the second plurality of pixels correspond to the motion of the second object within the second portion of the first digital image comprises:
providing at least the second portion of the first digital image as a second input to at least one classifier;
receiving a second output from the at least one classifier; and
determining that the second plurality of pixels corresponds to the motion of the second object based at least in part on the second output from the at least one classifier.

14. The computer-implemented method of claim 5, further comprising:
providing at least the first portion of the first image as a first input to a Laplacian operator;
determining the first blur metric for at least the first region of interest within the first image based at least in part on a first output of the Laplacian operator;
providing at least the second portion of the first image as a second input to the Laplacian operator; and
determining the second blur metric for at least the second region of interest within the first image based at least in part on a second output of the Laplacian operator.

15. The computer-implemented method of claim 5, further comprising:
identifying a plurality of regions of interest within the first digital image, wherein each of the regions of interest is associated with a respective one of a plurality of semantic objects; and
determining, for each of the plurality of regions of interest, a value of at least one attribute of the respective one of the plurality of semantic objects, wherein the at least one attribute is at least one of a shape, a size, a velocity, a feature, a color, a velocity, a marking, a level of reflectance or a frequency associated with the respective one of the semantic objects; and
ranking the plurality of regions of interest based at least in part on the value of the at least one attribute of the respective one of the semantic objects,
wherein the first region of interest has a highest value of the at least one attribute, and
wherein the second region of interest has a next-highest value of the at least one attribute.

16. The computer-implemented method of claim 5, further comprising:
identifying the first region of interest in at least a first portion of the second digital image;
determining a third blur metric for at least the first portion of the second digital image;
predicting a fourth focal length for capturing a fourth digital image based at least in part on at least one of the first focal length, the first blur metric, the second focal length or the third blur metric;
adjusting the lens to the fourth focal length with respect to the image sensor; and capturing the fourth digital image using the first imaging device.

17. The computer-implemented method of claim 16, wherein predicting the fourth focal length for capturing the third digital image further comprises:
determining at least one of a minimum level of blur or a maximum level of sharpness of the first region of interest based at least in part on the at least one of the first focal length, the first blur metric, the second focal length or the third blur metric; and
predicting a focal length for capturing a digital image with the at least one of the minimum level of blur or the maximum level of sharpness of the first region of interest using the first imaging device,
wherein the fourth focal length is the predicted focal length.

18. The computer-implemented method of claim 5, wherein the first digital image is captured at a first level of resolution,
wherein each of the second digital image and the third digital image is captured at a second level of resolution, and
wherein the second level of resolution is greater than the first level of resolution.

19. A mobile computing device comprising:
an imaging sensor having a photosensitive surface with a plurality of pixel sensors;
a lens;
at least one memory device;
at least one touchscreen display;
at least one computer processor, wherein the at least one computer processor is configured to at least:
capture a burst of image frames, wherein each of the image frames of the burst is captured with the lens at a different focal length with respect to the imaging sensor;

cause a display of a first one of the image frames of the burst on the touchscreen display;
receive a first selection of a first portion of the touchscreen display;
receive a second selection of a second portion of the touchscreen display;
identify a first portion of the first image frame corresponding to the first portion of the touchscreen display;
identify a second portion of the first image frame corresponding to the second portion of the touchscreen display;
identify a first plurality of semantically related pixels within the first portion of the first image frame;
identify a second plurality of semantically related pixels within the second portion of the first image frame;
define a first region of interest within the first image frame based at least in part on the first plurality of semantically related pixels;
define a second region of interest within the first image frame based at least in part on the second plurality of semantically related pixels;
determine a first value of a perceptual score for the first region of interest within the first portion of the first image frame, wherein the first value of the perceptual score is indicative of a level of sharpness of the first region of interest within the first image frame;
determine a second value of a perceptual score for the first region of interest within the portion of the first image frame, wherein the second value of the perceptual score is indicative of a level of sharpness of the second region of interest within the first image frame;
identify a first focal length at which the first image frame was captured;
predict a second focal length for capturing an image frame with the first region of interest at a third value of the perceptual score, wherein the third value is greater than the first value, and wherein the second focal length is predicted based at least in part on the first focal length and the first value of the perceptual score;
position the lens at the second focal length with respect to the imaging sensor;
capture a second image frame with the lens at the second focal length with respect to the imaging sensor; and
predict a third focal length for capturing an image frame with the second region of interest at a fourth value of the perceptual score, wherein the fourth value is greater than the second value, and wherein the third focal length is predicted based at least in part on the first focal length and the second value of the perceptual score.

20. The mobile computing device of claim 19, wherein the at least one computer processor is further configured to at least:
provide the first image frame as an input to at least one classifier;
identify the first plurality of semantically related pixels based at least in part on an output from the at least one classifier;
identify the second plurality of semantically related pixels based at least in part on the output from the at least one classifier; determine that the first plurality of semantically related pixels corresponds to a first semantic object;
define the first region of interest within the first image frame based at least in part on the first semantic object;
determine that the second plurality of semantically related pixels corresponds to a second semantic object; and
define the second region of interest within the second image frame based at least in part on the second semantic object.

* * * * *